(12) United States Patent
Winter et al.

(10) Patent No.: US 12,283,726 B2
(45) Date of Patent: Apr. 22, 2025

(54) FLOW BATTERY SYSTEM

(71) Applicant: UniEnergy Technologies, LLC, Mukilteo, WA (US)

(72) Inventors: Richard O. Winter, El Macero, CA (US); Kathryn M. Oseen-Senda, Seattle, WA (US); Brian Aher, Seattle, WA (US); Jonathan Horner, Everett, WA (US); Guanguang Xia, Everett, WA (US); Jinfeng Wu, Mukilteo, WA (US); Erik K. L. Johnson, Everett, WA (US); Jason I. Cruz, Kirkland, WA (US)

(73) Assignee: VENTURE LENDING & LEASING VIII, INC., Portola Valley, CA (US)

( * ) Notice: Subject to any disclaimer, the term of this patent is extended or adjusted under 35 U.S.C. 154(b) by 0 days.

(21) Appl. No.: 17/592,382

(22) Filed: Feb. 3, 2022

(65) Prior Publication Data

US 2024/0186543 A1    Jun. 6, 2024

Related U.S. Application Data

(63) Continuation of application No. 16/226,396, filed on Dec. 19, 2018, now Pat. No. 11,276,870.
(Continued)

(51) Int. Cl.
*H01M 8/04082*    (2016.01)
*C01B 7/01*    (2006.01)
(Continued)

(52) U.S. Cl.
CPC ......... *H01M 8/04201* (2013.01); *C01B 7/012* (2013.01); *H01M 8/04276* (2013.01); *H01M 8/188* (2013.01)

(58) Field of Classification Search
CPC ......... H01M 8/04201; H01M 8/04276; H01M 8/188; H01M 8/04007; H01M 8/2475; C01B 7/012; Y02E 60/50
See application file for complete search history.

(56) References Cited

U.S. PATENT DOCUMENTS 8,551,299 B2    10/2013  Keshavarz
9,722,264 B2     8/2017  Li et al.
(Continued)

FOREIGN PATENT DOCUMENTS

CN    105552268 A       5/2016
CN    107946617 A  *    4/2018   ........ H01M 8/04276
(Continued)

OTHER PUBLICATIONS

International Search Report and Written Opinion mailed May 31, 2019 for International Application No. PCT/US2018/066590; 12 Pages.

*Primary Examiner* — Daniel S Gatewood
(74) *Attorney, Agent, or Firm* — Polsinelli PC

(57) ABSTRACT

In accordance with embodiments of the present disclosure, a redox flow battery (RFB) may include a shell, an electrolyte storage tank assembly disposed in the shell, wherein at least a portion of the electrolyte storage tank assembly is supported by the shell, an electrochemical cell, and an electrolyte circulation system configured for fluid communication between the electrolyte storage tank assembly and the electrochemical cell. In some embodiments, at least a portion of the electrolyte storage tank assembly defines a tank assembly heat transfer system between an outer surface of the electrolyte storage tank assembly and an inner surface of the shell. In other embodiments, a pump assembly in the electrolyte circulation system is moveable between a first position and a second position. In other embodiments, a gas
(Continued)

management system includes a first gas exchange device in fluid communication with the catholyte headspace and the anolyte.

34 Claims, 17 Drawing Sheets

Related U.S. Application Data

(60) Provisional application No. 62/607,842, filed on Dec. 19, 2017.

(51) Int. Cl.
*H01M 8/04276* (2016.01)
*H01M 8/18* (2006.01)

(56) References Cited

U.S. PATENT DOCUMENTS

| | | | |
|---|---|---|---|
| 2011/0081561 A1 | 4/2011 | Keshavarz et al. | |
| 2016/0006054 A1* | 1/2016 | Li | H01M 8/04276 |
| | | | 429/418 |
| 2016/0006055 A1 | 1/2016 | Kell et al. | |
| 2018/0191005 A1* | 7/2018 | Faskin | H01M 8/04186 |

FOREIGN PATENT DOCUMENTS

| | | | | |
|---|---|---|---|---|
| WO | 2008116249 A1 | 10/2008 | | |
| WO | 2013038368 A1 | 3/2013 | | |
| WO | 2016105034 A1 | 6/2016 | | |
| WO | WO-2017006232 A1 * | 1/2017 | .......... | H01M 8/0289 |

* cited by examiner

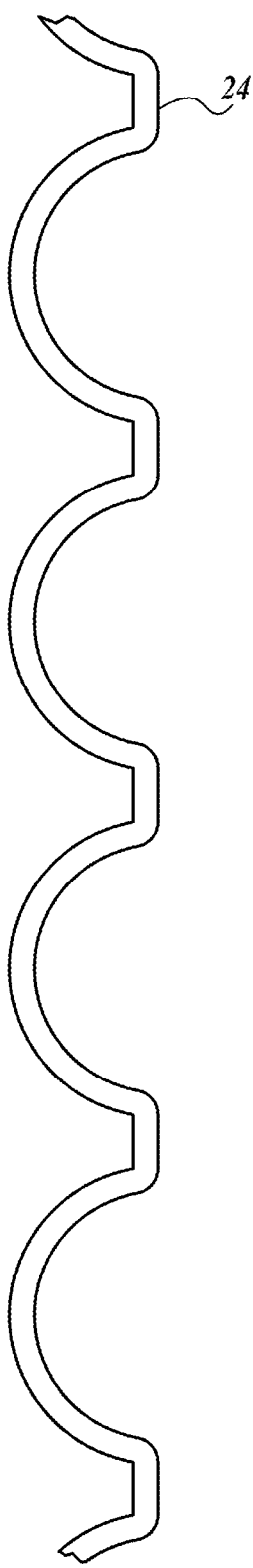 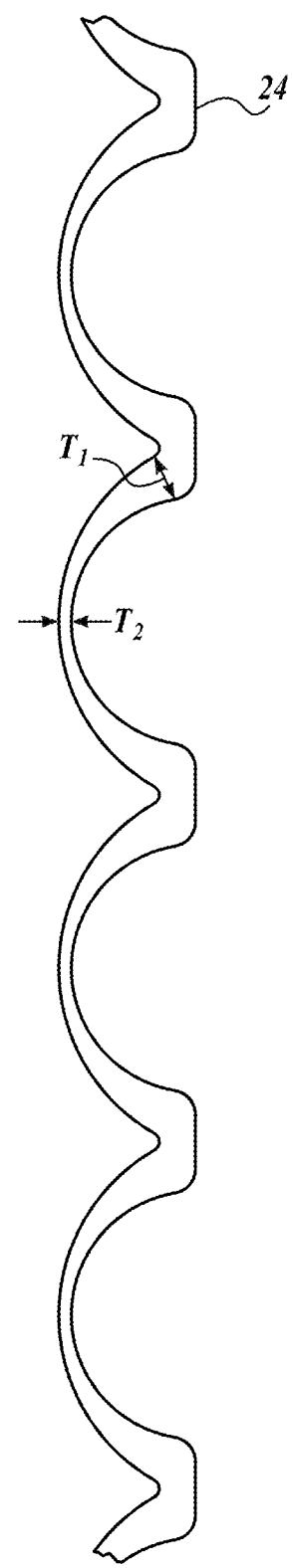
*FIG. 9A*　　　*FIG. 9B*

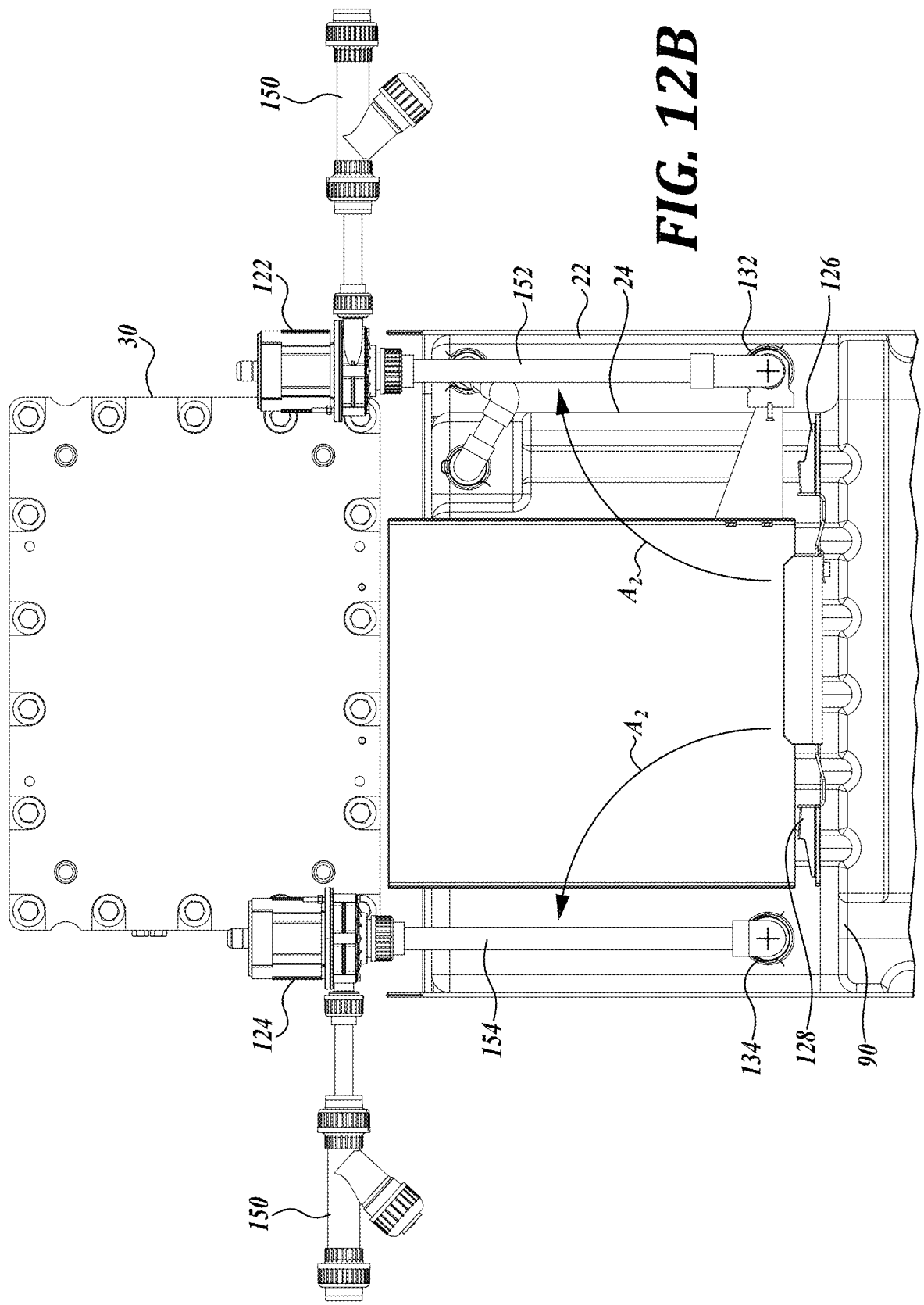

$$O_2 + 4V^{2+} + 4H^+ = 4V^{3+} + 2H_2O$$

$$Cl_2 + 2V^{2+} = 2V^{3+} + 2Cl^-$$

$$C_6H_{12}O_6 + 24VO_2^+ + 24H^+ = \\ 24\,VO^{2+} + 6\,CO_2 \uparrow + 18H_2O$$

FLOW BATTERY SYSTEM

CROSS-REFERENCES TO RELATED APPLICATIONS

This application is a continuation of U.S. patent application Ser. No. 16/226,396, filed Dec. 19, 2018, which claims the benefit of U.S. Provisional Application No. 62/607,842, filed Dec. 19, 2017, the disclosures of which are expressly incorporated by reference herein in their entirety.

BACKGROUND

Concerns over the environmental consequences of burning fossil fuels have led to an increasing use of renewable energy generated from sources such as solar and wind. The intermittent and varied nature of such renewable energy sources, however, has made it difficult to fully integrate these energy sources into existing electrical power grids and distribution networks. A solution to this problem has been to employ large-scale electrical energy storage (EES) systems. These systems are widely considered to be an effective approach to improve the reliability, power quality, and economy of renewable energy derived from solar or wind sources.

In addition to facilitating the integration of renewable wind and solar energy, large scale EES systems also may have the potential to provide additional value to electrical grid management, for example: resource and market services at the bulk power system level, such as frequency regulation, spinning reserves, fast ramping capacity, black start capacity, and alternatives for fossil fuel peaking systems: transmission and delivery support by increasing capability of existing assets and deferring grid upgrade investments: micro-grid support: and peak shaving and power shifting.

Among the most promising large-scale EES technologies are redox flow batteries (RFBs). RFBs are special electrochemical systems that can repeatedly store and convert megawatt-hours (MWhs) of electrical energy to chemical energy and chemical energy back to electrical energy when needed. RFBs are well-suited for energy storage because of their ability to tolerate fluctuating power supplies, bear repetitive charge/discharge cycles at maximum rates, initiate charge/discharge cycling at any state of charge, design energy storage capacity and power for a given system independently, deliver long cycle life, and operate safely without fire hazards inherent in some other designs.

In simplified terms, an RFB electrochemical cell is a device capable of either deriving electrical energy from chemical reactions, or facilitating chemical reactions through the introduction of electrical energy. In general, an electrochemical cell includes two half-cells, each having an electrolyte. The two half-cells may use the same electrolyte, or they may use different electrolytes. With the introduction of electrical energy, species from one half-cell lose electrons (oxidation) to their electrode while species from the other half-cell gain electrons (reduction) from their electrode.

Multiple RFB electrochemical cells electrically connected together in series within a common housing are generally referred to as an electrochemical "stack". Multiple stacks electrically connected together are generally referred to as a "string". Multiple stings electrically connected together are generally referred to as a "site".

A common RFB electrochemical cell configuration includes two opposing electrodes separated by an ion exchange membrane or other separator, and two circulating electrolyte solutions, referred to as the "anolyte" and "catholyte". The energy conversion between electrical energy and chemical potential occurs instantly at the electrodes when the liquid electrolyte begins to flow through the cells.

To meet industrial demands for efficient, flexible, rugged, compact, and reliable large-scale ESS systems with rapid, scalable, and low-cost deployment, there is a need for improved RFB systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a redox flow battery (RFB) is provided. The redox flow battery (RFB) includes: a shell: an electrolyte storage tank assembly disposed in the shell, wherein at least a portion of the electrolyte storage tank assembly is supported by the shell and wherein at least a portion of the electrolyte storage tank assembly defines a tank assembly heat transfer system between an outer surface of the electrolyte storage tank assembly and an inner surface of the shell: an electrochemical cell: and an electrolyte circulation system configured for fluid communication between the electrolyte storage tank assembly and the electrochemical cell.

In accordance with another embodiment of the present disclosure, a tank and shell secondary containment system is provided. The system includes: a shell; and a tank disposed within the shell, wherein at least a portion of the tank is supported by the shell and wherein at least a portion of the tank defines a heat transfer system between an outer surface of the tank and an inner surface of the shell, wherein the heat transfer system includes a plurality of air flow channels and an air circulation device.

In accordance with another embodiment of the present disclosure, a method of heat transfer for a redox flow battery (RFB) is provided. The method includes: operating a redox flow battery having a shell, an electrolyte storage tank assembly disposed in the shell, wherein at least a portion of the electrolyte storage tank assembly is supported by the shell and wherein at least a portion of electrolyte storage tank assembly defines a tank assembly heat transfer system between an outer surface of the electrolyte storage tank assembly and an inner surface of the shell, an electrochemical cell, and an electrolyte circulation system configured for fluid communication between the electrolyte storage tank and the electrochemical cell: and circulating air through the tank assembly heat transfer system between an outer surface of the electrolyte storage tank assembly and the inner surface of the shell.

In any of the embodiments described herein, the heat transfer system may include a plurality of air flow channels and an air circulation device.

In any of the embodiments described herein, the tank assembly heat transfer system may include a plurality of tank abutments and a plurality of tank channels, with two tank abutments adjacent each channel.

In any of the embodiments described herein, the electrolyte storage tank assembly may include one or more tank walls having a wall thickness.

In any of the embodiments described herein, the one or more tank walls may have substantially constant wall thickness.

In any of the embodiments described herein, the one or more tank walls may have variable wall thickness.

In any of the embodiments described herein, the redox flow battery may be a vanadium redox flow battery.

In any of the embodiments described herein, the electrolyte storage tank assembly may include a catholyte tank and an anolyte tank.

In any of the embodiments described herein, the catholyte tank and the anolyte tank may be in a side-by-side configuration in the shell.

In any of the embodiments described herein, each of the catholyte tank and the anolyte tank may define a portion of the tank assembly heat transfer system between an outer surface of each tank and an inner surface of the shell.

In any of the embodiments described herein, the anolyte tank has a volume and wherein the catholyte tank has a volume, and the ratio of the volume of the anolyte tank to the volume of the catholyte tank may be in the range of 1.05:1 to about 1.5:1. In any of the embodiments described herein, the catholyte tank and the anolyte tank may have substantially the same footprint in contact with a bottom surface of the shell.

In any of the embodiments described herein, the catholyte tank and the anolyte tank may have substantially the same liquid level.

In any of the embodiments described herein, the catholyte tank may include a stepped shelf to reduce the volume of the catholyte tank compared to the anolyte tank.

In accordance with another embodiment of the present disclosure, a redox flow battery (RFB) is provided. The redox flow battery (RFB) includes: a shell having a shell height: an electrolyte storage tank assembly disposed in the shell, wherein at least a portion of the electrolyte storage tank assembly is supported by the shell, the electrolyte storage tank assembly having an electrolyte liquid height, wherein the electrolyte liquid height is at or below the shell height: an electrochemical cell: and an electrolyte circulation system configured for fluid communication between the electrolyte storage tank assembly and the electrochemical cell, wherein the electrolyte circulation system includes a pump assembly, wherein the pump assembly is moveable between a first position in the shell and below the electrolyte liquid height during operation of the pump assembly and a second position and above the electrolyte liquid height when the pump assembly is not operating.

In accordance with another embodiment of the present disclosure, a tank system configured for holding a liquid is provided. The system includes: a shell having a shell height: a tank disposed within the shell, wherein at least a portion of the tank is supported by the shell and having a liquid height, wherein the liquid height is at or below the shell height: and an liquid circulation system configured including a pump assembly, wherein the pump assembly is moveable between a first position in the shell and below the liquid height during operation of the pump assembly and a second position above the electrolyte liquid height when the pump assembly is not operating.

In accordance with another embodiment of the present disclosure, a method of servicing a pump in a redox flow battery (RFB) is provided. The method includes: operating a redox flow battery having a shell having a shell height, an electrolyte storage tank assembly disposed in the shell, wherein at least a portion of the electrolyte storage tank assembly is supported by the shell, the electrolyte storage tank assembly having an electrolyte liquid height, wherein the electrolyte liquid height is at or below the shell height, an electrochemical cell, and an electrolyte circulation system configured for fluid communication between the electrolyte storage tank assembly and the electrochemical cell, wherein the electrolyte circulation system includes a pump assembly, wherein the pump assembly is moveable between a first position in the shell and below the electrolyte liquid height during operation of the pump assembly and a second position above the electrolyte liquid height when the pump assembly is not operating: turning off the pump assembly: and moving the pump assembly to the second position.

In any of the embodiments described herein, the electrolyte storage tank assembly may include a shelf located at a height above the bottom of the electrolyte storage tank assembly and below the shell height defining a space within the shell.

In any of the embodiments described herein, the pump assembly may be located in the space within the shell.

In any of the embodiments described herein, the pump assembly may be coupled to first and second connections of the electrolyte circulation system when in the first position.

In any of the embodiments described herein, the pump assembly may be uncoupled from a first connection to the electrolyte circulation system and may remain coupled to a second connection to the electrolyte circulation system when in the second position.

In any of the embodiments described herein, the pump assembly may be rotatable between the first position and the second position while coupled to the second connection in the electrolyte circulation system.

In any of the embodiments described herein, the pump may include a filter and/or a union.

In any of the embodiments described herein, the redox flow battery may be a vanadium redox flow battery.

In any of the embodiments described herein, the electrolyte storage tank assembly may include a catholyte tank and an anolyte tank.

In any of the embodiments described herein, the catholyte tank and the anolyte tank may be in a side-by-side configuration in the shell.

In any of the embodiments described herein, each of the catholyte tank and the anolyte tank may define a portion of the tank heat transfer system between an outer surface of each tank and an inner surface of the shell.

In any of the embodiments described herein, the anolyte tank has a volume and wherein the catholyte tank has a volume, and the ratio of the volume of the anolyte tank to the volume of the catholyte tank may be in the range of 1.05:1 to about 1.5:1.

In any of the embodiments described herein, the catholyte tank and the anolyte tank may have substantially the same footprint in contact with a bottom surface of the shell.

In any of the embodiments described herein, the catholyte tank and the anolyte tank may have substantially the same liquid level.

In any of the embodiments described herein, the catholyte tank may include a stepped shelf to reduce the volume of the catholyte tank compared to the anolyte tank.

In any of the embodiments described herein, the pump assembly may include catholyte and anolyte pumps.

In any of the embodiments described herein, the pump assembly may include catholyte and anolyte filters.

In any of the embodiments described herein, the pump assembly in a second position may be above the electrolyte liquid height when the pump assembly is not operating.

In accordance with another embodiment of the present disclosure, a redox flow battery (RFB) is provided. The redox flow battery (RFB) includes: an anolyte storage tank configured for containing a quantity of anolyte and an anolyte headspace: a catholyte storage tank configured for containing a quantity of a catholyte and a catholyte headspace: and a gas management system comprising a first gas exchange device having a first end in fluid communication with the catholyte headspace and a second end in fluid communication with anolyte in the anolyte storage tank.

In accordance with another embodiment of the present disclosure, a method of operating a redox flow battery is provided. The method includes: operating an RFB having electrolyte storage tank assembly including an anolyte storage tank configured for containing a quantity of anolyte and an anolyte headspace and a catholyte storage tank configured for containing a quantity of a catholyte and a catholyte headspace, an electrochemical cell, and an electrolyte circulation system configured for fluid communication between the electrolyte storage tank assembly and the electrochemical cell; transferring gas from the catholyte headspace and depositing the gas the anolyte in the anolyte storage tank.

In any of the embodiments described herein, the first gas exchange device may include a gas treatment zone for treating evolving gas that is evolving from the catholyte.

In any of the embodiments described herein, the evolving gas may include oxygen, carbon dioxide, hydrogen, and chlorine, and any combination thereof.

In any of the embodiments described herein, the redox flow battery may be selected from the group consisting of a vanadium-sulfate redox flow battery, a vanadium-chloride redox flow battery, a vanadium-mixed sulfate and chloride battery, a vanadium-iron redox flow battery, and an iron-chromium redox flow battery.

In any of the embodiments described herein, the redox flow battery may be a vanadium redox flow battery.

In any of the embodiments described herein, the gas treatment zone may include UV treatment.

In any of the embodiments described herein, chlorine and hydrogen evolving gases may be recombined to form hydrogen chloride.

In any of the embodiments described herein, the UV treatment may promote the recombination of hydrogen and chlorine gas into hydrogen chloride.

In any of the embodiments described herein, the first gas exchange device may include a vacuum to draw gas from the catholyte headspace.

In any of the embodiments described herein, the first end of the first gas exchange device may include a venturi.

In any of the embodiments described herein, the second end of the first gas exchange device may be below the liquid level in the anolyte.

In any of the embodiments described herein, the gas treatment zone may include a heat sensor.

In any of the embodiments described herein, the gas management system may further include a second gas exchange device for gas exchange between the catholyte headspace and the anolyte headspace.

In any of the embodiments described herein, the gas management system may further include a third gas exchange device configured to contain or release an evolving gas from either or both of the anolyte and catholyte storage tanks to an exterior battery environment when an interior battery pressure exceeds an exterior battery pressure by a predetermined amount.

In any of the embodiments described herein, the third gas exchange device may be a liquid-filled U-shaped tube.

In any of the embodiments described herein, the third gas exchange device may include an arrangement of one or more of pressure-regulated, pressure relief, or check valves.

In any of the embodiments described herein, a method of operation may further include treating the gas with treatment before depositing the gas in to a location at or below the liquid level of the anolyte in the anolyte storage tank.

In any of the embodiments described herein, the treatment may be UV treatment.

In any of the embodiments described herein, the gas may be transferred to a location at or below the liquid level of the anolyte in the anolyte storage tank.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIGS. 9A and 9B are cross-sectional views through exemplary tank walls of redox flow batteries in accordance with embodiments of the present disclosure:

FIGS. 12A and 12B are front views of a pumping system for the redox flow battery of FIG. 1, showing different pump assembly configurations:

DETAILED DESCRIPTION

Figure 1:
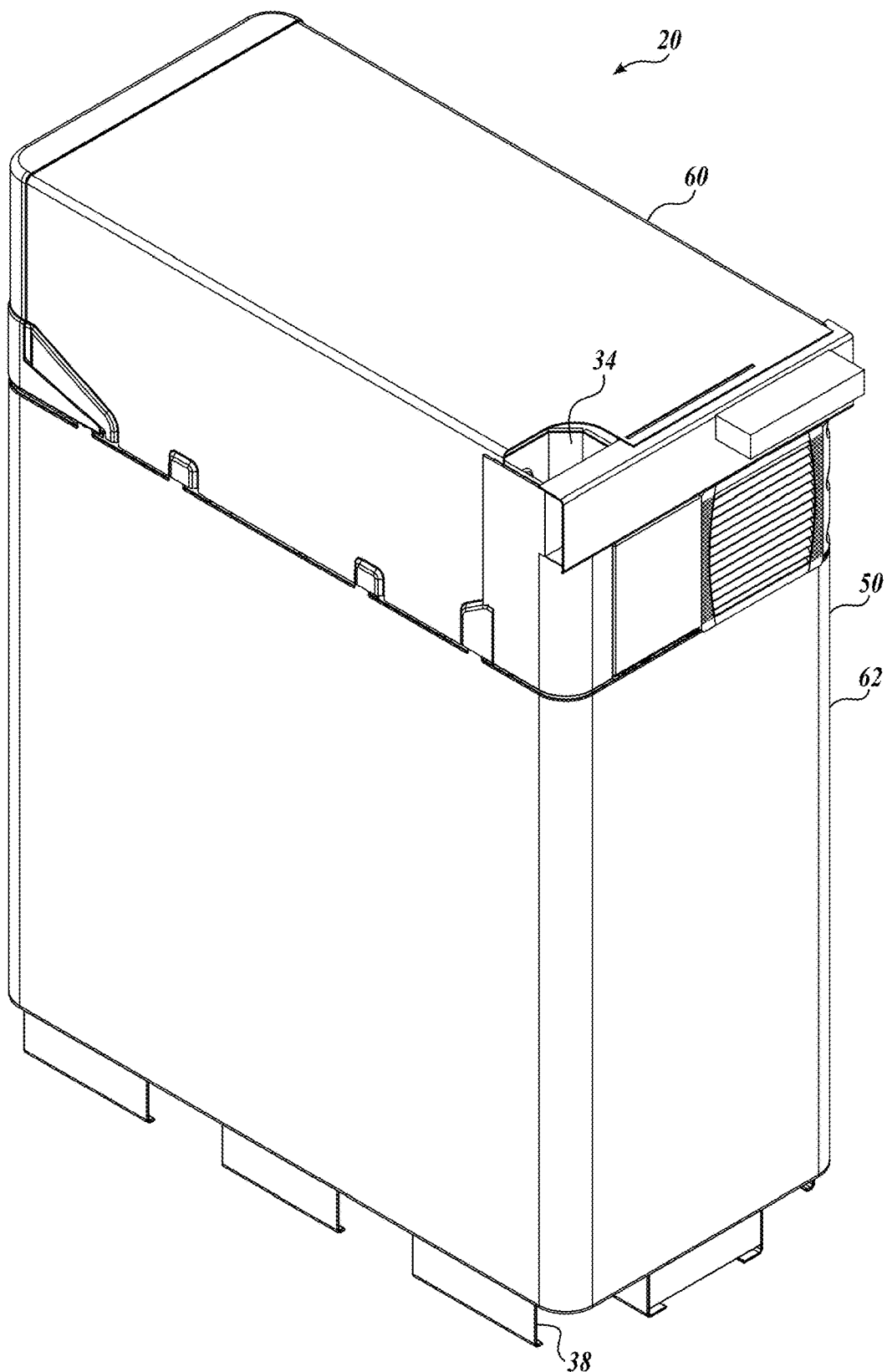
FIG. 1 is an isometric view of a redox flow battery in accordance with one embodiment of the present disclosure.

Embodiments of the present disclosure are directed to redox flow batteries (RFBs), systems and components thereof, stacks, strings, and sites, as well as methods of operating the same. Referring to FIGS. 1-4, a redox flow battery 20 in accordance with one embodiment of the present disclosure is provided. Multiple redox flow batteries may be configured in a "string" of batteries, and multiple strings may be configured into a "site" of batteries.

As with other battery systems, a redox flow battery 20 is configured to store energy from an energy source and supply it when needed. Multiple redox flow batteries may be electrically connected in series or in parallel depending on the design of the system.

Redox Flow Battery

Referring to FIGS. 1-4, major components in an RFB 20 include a tank assembly 26 including anolyte and catholyte tanks 22 and 24, the electrochemical cell 30, a system for circulating electrolyte 40, a gas management system 94, and a shell 50 to house all of the components and provide secondary liquid containment. In the illustrated embodiment, the RFB 20 includes one electrochemical cell 30. However, in other embodiments of the present disclosure, and RFB 20 may include a stack of multiple electrochemical cells, for example, as described in U.S. Pat. No. 9,722,264, issued Aug. 1, 2017, the disclosure of which is expressly incorporated by reference herein in its entirety.

Figure 2:
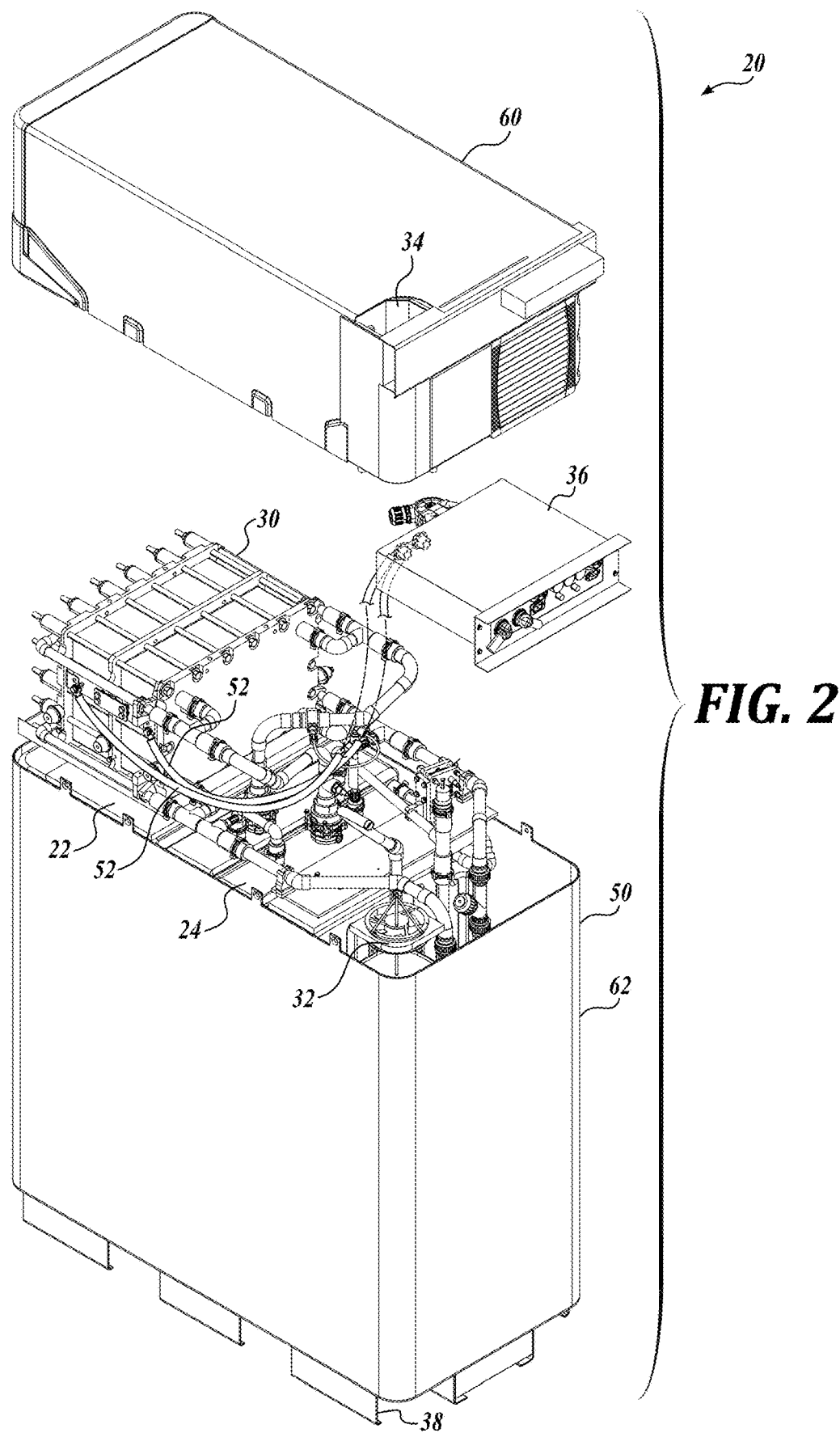
FIG. 2 is a partially exploded isometric view of the redox flow battery of FIG. 1.
Figure 6:
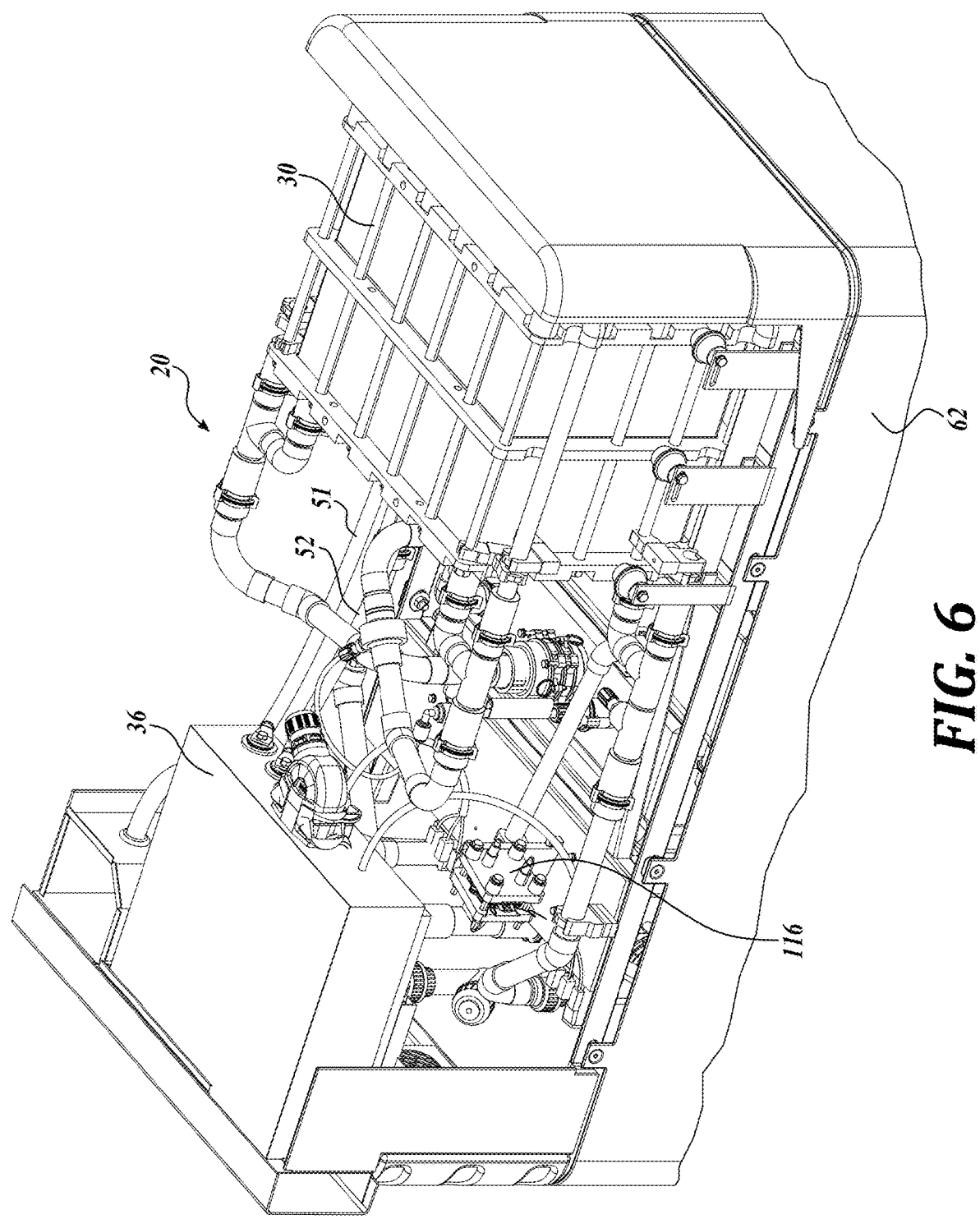
FIG. 6 is a close-up, rear isometric view of various components of the redox flow battery of FIG. 1.

Referring to FIG. 2, a control box 36 is coupled to the electrochemical cell 30 via contact lines 51 and 52 to monitor and control the system (see also FIG. 6).

In the present disclosure, flow electrochemical energy systems are generally described in the context of an exemplary vanadium redox flow battery (VRB), wherein a $V^{3+}/V^{2+}$ electrolyte serves as the negative electrolyte ("anolyte") and a $V^{5+}/V^{4+}$ electrolyte serves as the positive electrolyte ("catholyte"). However, other redox chemistries are contemplated and within the scope of the present disclosure, including, as non-limiting examples, $V^{2+}/V^{3+}$ vs. $Br^-/ClBr_2$, $Br_2/Br^-$ vs. $S/S^{2-}$, $Br/Br_2$ vs. $Zn^{2+}/Zn$, $Ce^{4+}/Ce^{3+}$ vs. $V^{2+}/V^{3+}$, $Fe^{3+}/Fe^{2+}$ vs. $Br_2/Br^-$, $Mn^{2+}/Mn^{3+}$ vs. $Br_2/Br^-$, $Fe^{3+}/Fe^{2+}$ vs. $Ti^{2+}/Ti^{4+}$, etc.

As a non-limiting example, in a vanadium flow redox battery (VRB) prior to charging, the initial anolyte solution and catholyte solution each include identical concentrations of $V^{3+}$ and $V^{4+}$. Upon charge, the vanadium ions in the anolyte solution are reduced to $V^{2+}/V^{3+}$ while the vanadium ions in the catholyte solution are oxidized to $V^{4+}/V^{5+}$.

In accordance with embodiments of the present disclosure, the anolyte and catholyte in a VRB may include vanadium ions and hydrochloric acid or a mix of sulfuric acid and hydrochloric acid. In accordance with other embodiments of the present disclosure, the anolyte and catholyte in a VRB may include sulfate chemistry.

Referring to the schematic in FIG. 3A, general operation of the redox flow battery system 20 of FIGS. 1 and 2 will be described. The redox flow battery system 20 operates by circulating the anolyte and the catholyte from their respective tanks 22 and 24 into the electrochemical cell 30. The cell 30 operates to discharge or store energy as directed by power and control elements in electrical communication with the electrochemical cell 30.

In one mode (sometimes referred to as the "charging" mode), power and control elements connected to a power source operate to store electrical energy as chemical potential in the anolyte and catholyte. The power source can be any power source known to generate electrical power, including combustion power sources, as well as renewable power sources, such as wind, solar, and hydroelectric.

In a second ("discharge") mode of operation, the redox flow battery system 20 is operated to transform chemical potential stored in the anolyte and catholyte into electrical energy that is then discharged on demand by power and control elements that supply an electrical load.

Each electrochemical cell 30 in the system 20 includes a positive electrode, a negative electrode, at least one catholyte channel, at least one anolyte channel, and an ion transfer membrane separating the catholyte channel and the anolyte channel. The ion transfer membrane separates the electrochemical cell into a positive side and a negative side. Selected ions (e.g., H+) are allowed to transport across an ion transfer membrane as part of the electrochemical charge and discharge process. The positive and negative electrodes are configured to cause electrons to flow along an axis normal to the ion transfer membrane during electrochemical cell charge and discharge (see, e.g., lines 51 and 52 in FIGS. 2 and 4). As can be seen in FIG. 3A, fluid inlets 48 and 44 and outlets 46 and 42 are configured to allow integration of the electrochemical cell 30 into the redox flow battery system 20.

To obtain high voltage, high power systems, a plurality of single electrochemical cells may be assembled together in series to form a stack of electrochemical cells (referred to herein as a "stack," a "cell stack," or an "electrochemical cell stack". In the illustrated embodiment, the stack includes two half-stacks (or half cells) to form a battery system 20. Likewise, several cell stacks may then be further assembled together to form a battery system 20. A MW-level RFB system generally has a plurality of cell stacks, for example, with each cell stack having a plurality of electrochemical cells. As described for an individual electrochemical cell, the stack can be arranged with positive and negative current collectors that cause electrons to flow through the cell stack generally along an axis normal to the ion transfer membranes and current collectors during electrochemical charge and discharge (see, e.g., lines 51 and 52 shown in FIG. 4 for a single stack battery and also shown in FIG. 6).

The ion exchange membrane in each electrochemical cell prevents crossover of the active materials between the positive and negative electrolytes while supporting ion transport to complete the circuit. Ion exchange membrane material, in a non-limiting example, a perfluorinated membrane such as NAFION or GORE-SELECT, may be used in the electrochemical cells.

Ion exchange through the membrane ideally prevents the transport of active materials between the anolyte and catholyte. However, data obtained from operating vanadium redox batteries (VRBs) shows capacity fading over time when the system is operating without any capacity fading mitigation features as described herein. Such capacity fading may, at least in part, be attributed to some transport of vanadium ions across the membrane. Different vanadium cations in the system have different concentration diffusion coefficients and electric-migration coefficients for crossing over through the membrane. These differences contribute to an unbalanced vanadium transfer between anolyte and catholyte after multiple cycles of operation, which may result in a loss of energy storage capacity.

Other negative effects caused by the transport of vanadium ions across the membrane include precipitation, which may occur if the vanadium ion concentration in the catholyte continues to increase as a result of the net transfer of vanadium ions. Precipitate may form in the electrode stacks, which may result in degradation in the performance of the VRB system. As a non-limiting example, precipitation of $V^{5+}$ as $V_2O_5$ can occur in the catholyte (thereby decreasing the amount and/or the concentration and amount of $V^{5+}$ in the catholyte).

In addition to the transport of vanadium ions across the membrane and precipitation, other electrochemical side reactions may contribute to decreased performance in VRB systems. These reactions must also be addressed to maximize the capacity and service life of the system, while minimizing cost and service requirements for the life of the battery. For example, under some operating conditions, side reactions may produce excess hydrogen and chlorine gases in the headspaces of the anolyte and/or catholyte tanks. Other detrimental reactions may also occur when electrolyte is exposed to oxidizing agents such as oxygen. In one example, over time, the anolyte is susceptible to $V^{2+}$ oxidation by atmospheric oxygen that is introduced into the tank during maintenance, installation, or other operations (thereby decreasing the amount and/or concentration of $V^{2+}$). As another example, hydrogen can be generated as a consequence of insufficient supply of reactants in the anolyte.

Described herein are systems and methods of operation designed for mitigating the capacity decaying effects described above to improve RFB performance on a battery, string, and site level. In general, these features can be described in terms of maintaining electrolyte stability by applying active and passive charge balancing, employing specific methods for analysis and adjustment of electrolyte composition, and process gas management.

Power Architecture

Figure 5:
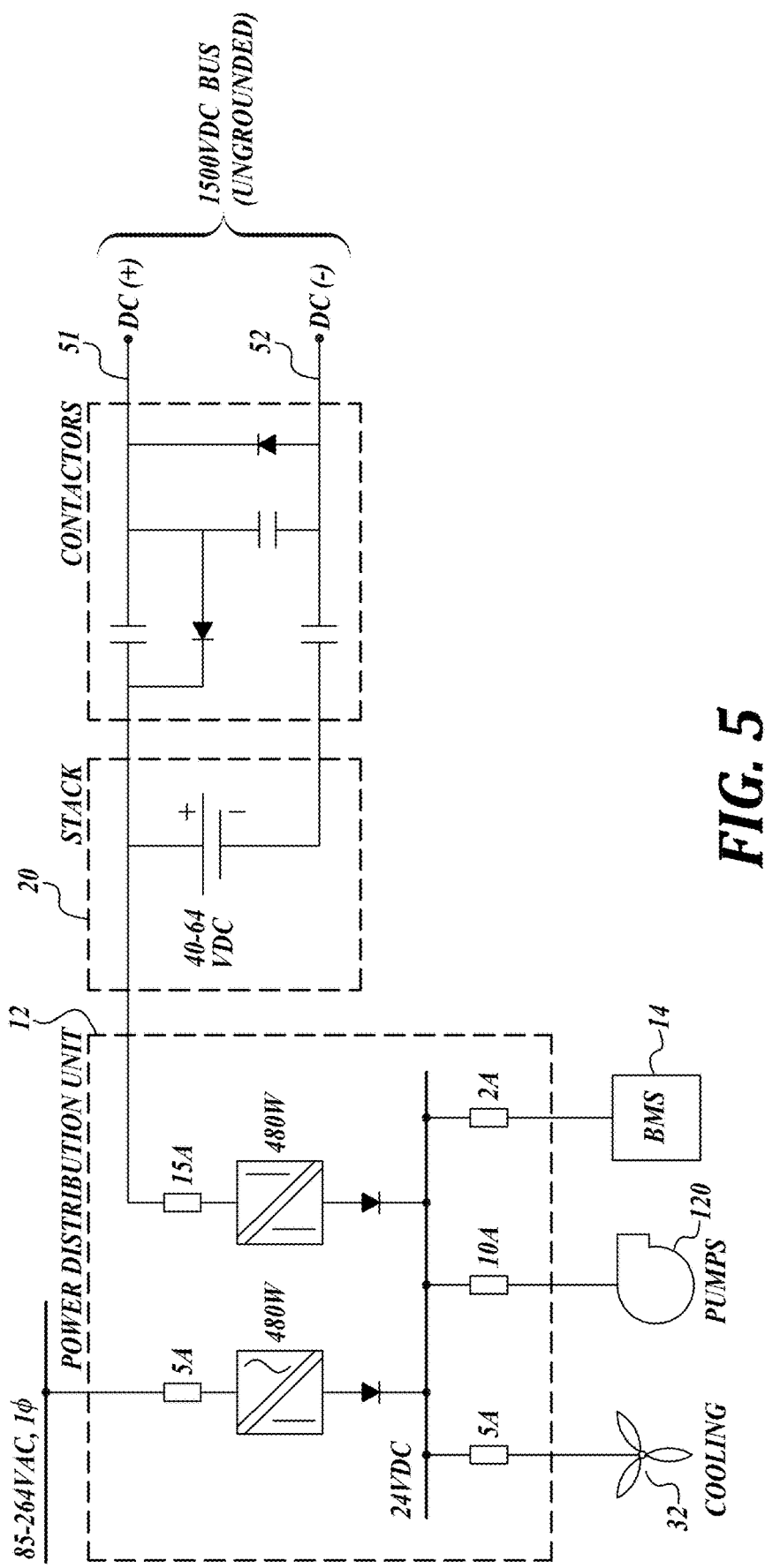
FIG. 5 is a schematic view of power architecture for a redox flow battery in accordance with one embodiment of the present disclosure.

Referring to FIG. 5, an exemplary schematic diagram of power architecture for a redox flow battery 20 is provided in accordance with one embodiment of the present disclosure. The major components of the system in the power architecture include a power distribution unit 12, the battery 20, and contacts 51 and 52. Auxiliary loads powered by the power distribution unit as shown in the diagram include electrolyte pumps 120, cooling fan 32, and the BMS 14 (a battery management system). The auxiliary loads may be powered by external AC or the stack DC power.

The BMS is a controller which implements operational logic for the redox flow battery. The BMS may provide an interface for higher level control, which may allow for operation and data acquisition. The BMS may be used to connect or disconnect the battery, and when connected, to operate the battery within safe parameters.

When the battery is connected, the series contactors are closed and the BMS controls the speed of the electrolyte pumps and cooling fan to optimize the system efficiency. If the battery is part of a string, state of charge (SOC) matching may be performed.

When the battery is disconnected, the series contactors are open, and the pumps and fans are disabled. However, if the battery is configured for black start (which is preserving power reserves to restart and restarting by using stored power in the battery system), the battery will enable the pumps periodically to maintain useable energy in the stack.

Battery Containment System, Electrolyte Tank Assembly, and General Arrangement

Figure 3:
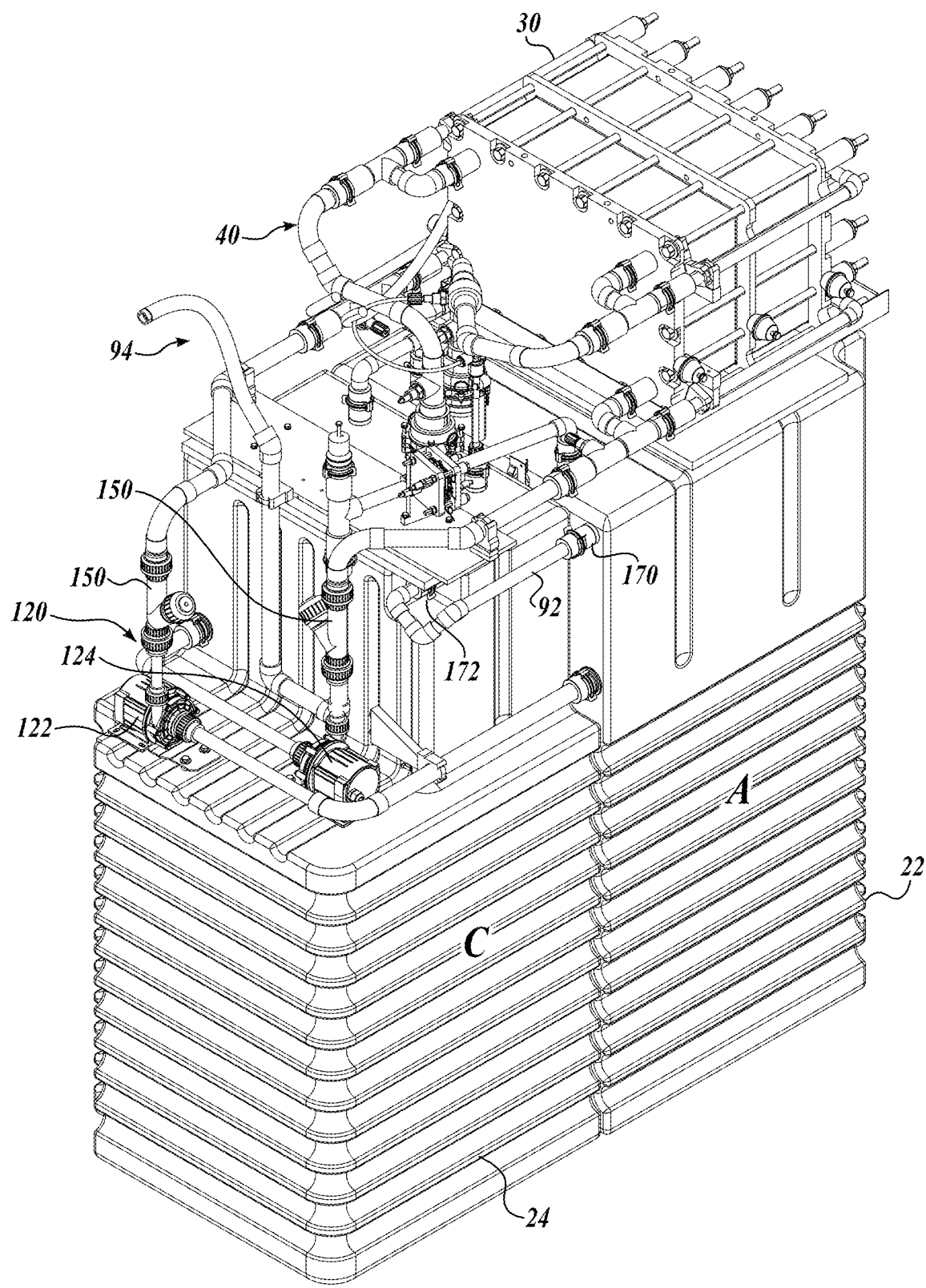
FIG. 3 is an isometric view of major internal components of the redox flow battery of FIG. 1 including anolyte and catholyte tanks, an electrochemical cell, a system for circulating electrolyte, and a gas management system.
Figure 4:
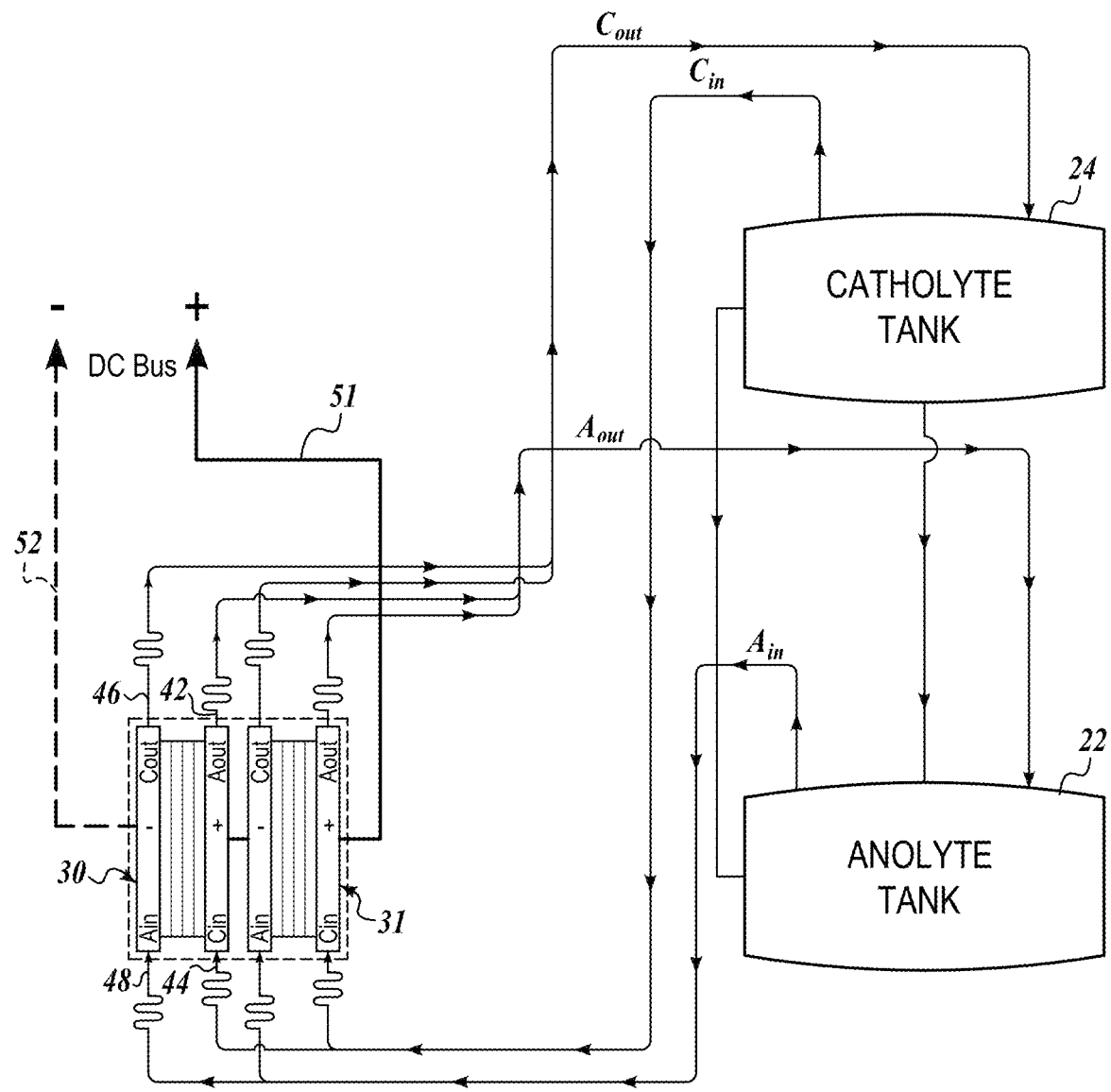
FIG. 4 is a schematic view of various components of a redox flow battery in accordance with embodiments of the present disclosure.

Referring now to FIGS. 1 and 2, each RFB 20 includes a shell 50 that houses components of the system in a substantially closed manner. Referring to FIG. 3, these components generally include the tank assembly 26 including anolyte and catholyte tanks 22 and 24, the electrochemical cell 30, a system for circulating electrolyte 40, and a gas management system 94. The configuration of each of these components will now be described in more detail.

FIGS. 1 and 2 depict the shell 50 that houses, for example, the components shown in FIG. 3. The container 50 can be configured in some embodiments to be an integrated structure that facilitates or provides one or more of the following characteristics: compact design, ease of assembly, transportability, compact multiple-container arrangements and structures, accessibility for maintenance, and secondary containment.

As will be described in more detail below, the tanks 22 and 24 of the RFB 20 are configured so as to be closely fitted within the compartment or compartments, thereby maximizing the storage volume of electrolyte within the shell 50 and providing structural support and non-permeable containment for the volume of electrolyte in the RFB 20, which is directly proportional to the energy storage of the battery 20.

The shell 50 is generally sized to fit within a standard door size for ease of shipping and ease of installation. In some embodiments, the shell 50 has a standard dimensioning of 30" in width by 57" in depth and 78" in height. In some of these embodiments, the shell 50 can be additionally configured to meet shipping container certification standards for registration and ease of transportation via rail, cargo ship, or other possible shipping channels.

The shell 50 also includes various features to allow for the RFB 20 to be easily placed in service and maintained on site. For example, a removable lid 60 from the main compartment 62 of the shell 50, an electrical box 36 located at the top of the RFB 20 for ease of access, and pumps and other serviceable components configured for accessibility for replacement or repair.

The shell 50 may be manufactured from any suitable materials, including but not limited to continuously welded or extruded metal (such as sheet steel, stainless steel, titanium, or aluminum) or plastics. The shell 50 may be coated to be chemical resistant.

Although secondary containment of the redox flow battery 20 and the electrolyte stored in the RFB 20 by the shell 50 is generally desirable, secondary containment by a shell 50 may not be needed for some battery deployments. In some embodiments, the shell 50 may be a single integrated component. Likewise, in some deployments, the main compartment 62 of the shell 50 may be used without a lid 60.

Electrolyte Tank and Assembly

Figure 7:
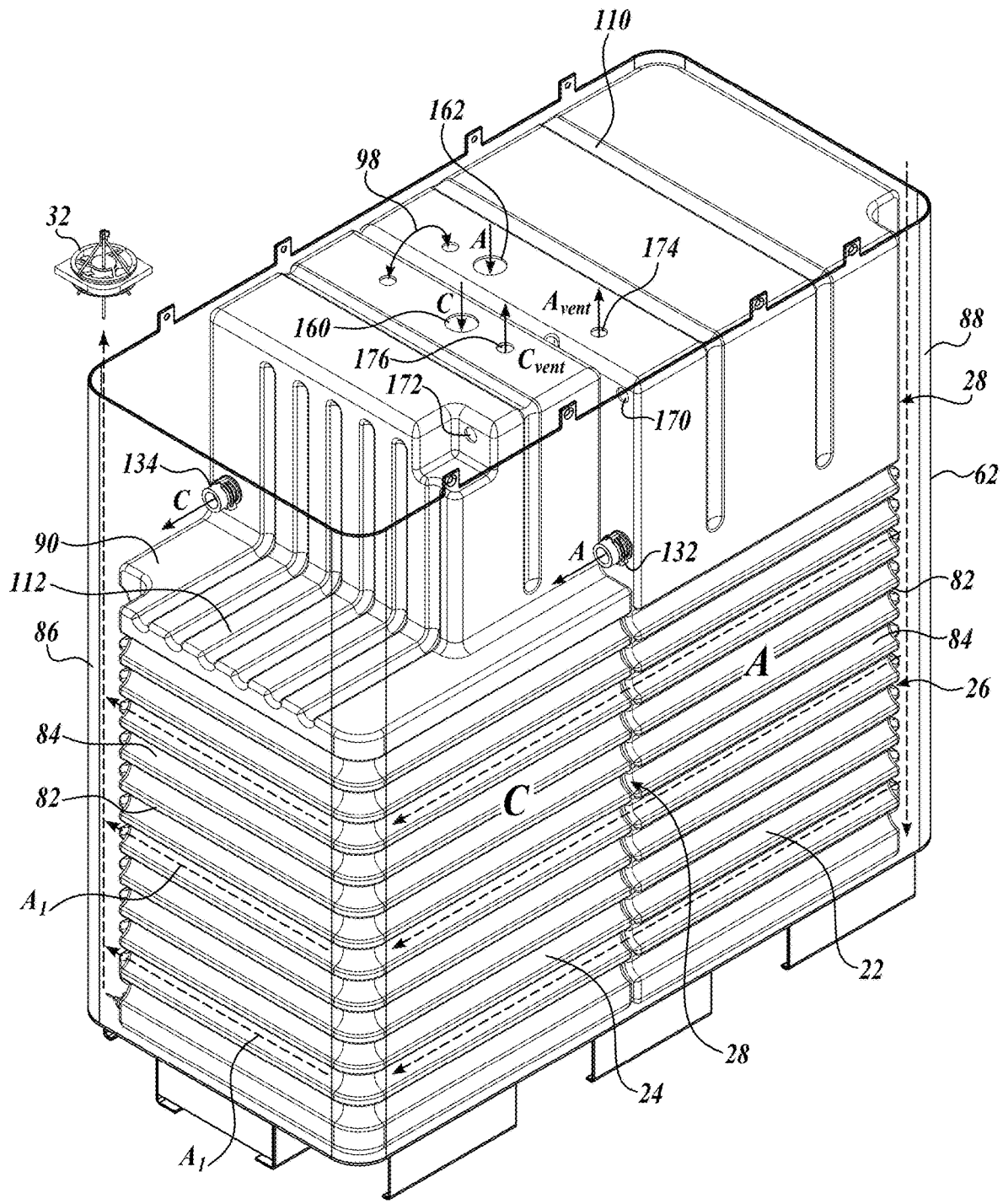
FIG. 7 is an isometric view of the tank assembly of the redox flow battery of FIG. 1 showing exemplary air flow paths around the tank.
Figure 8:
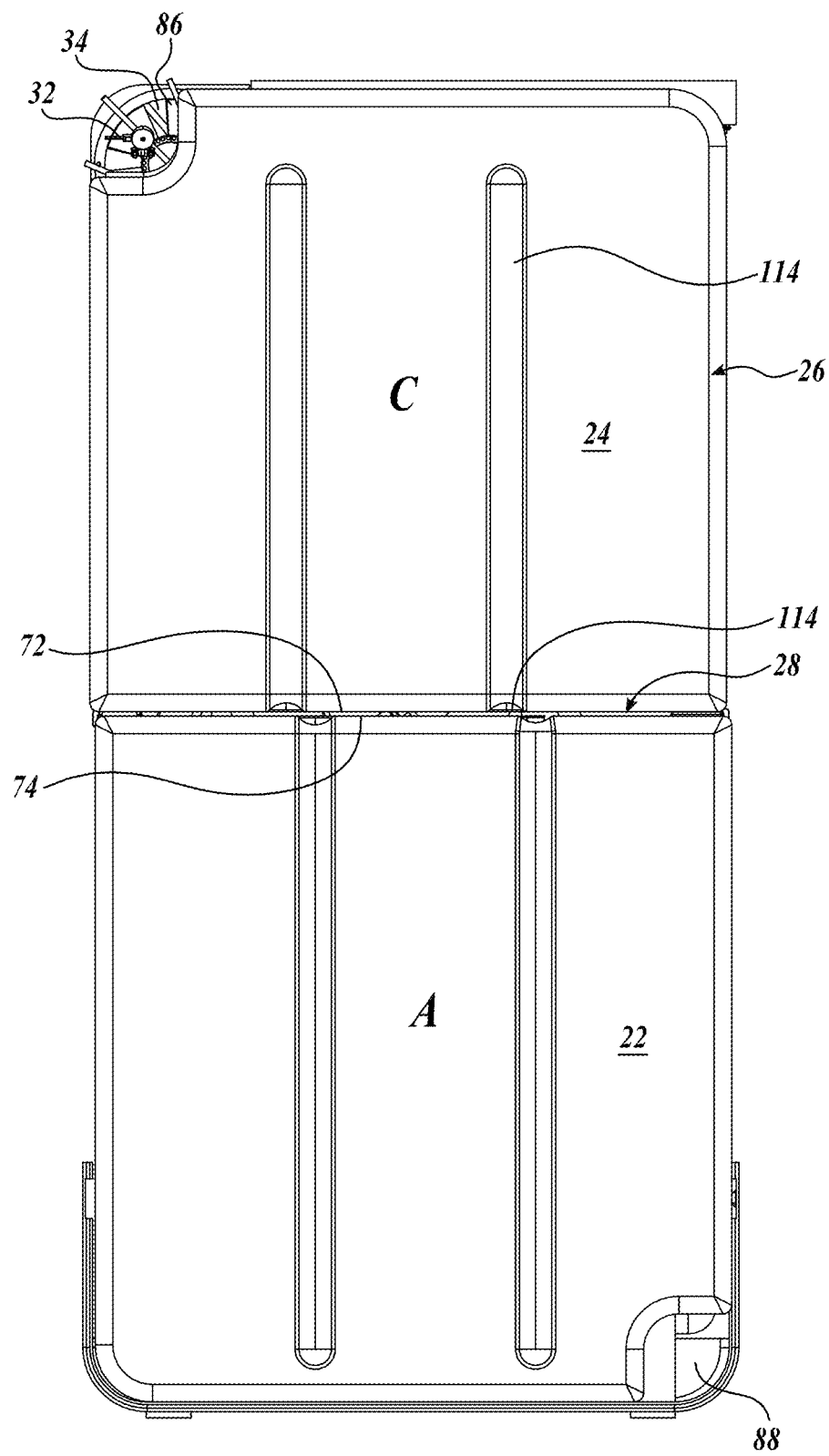
FIG. 8 is a bottom view of the tank assembly of the redox flow battery of FIG. 1.

Referring to FIGS. 7 and 8, the tank assembly 26 including the anolyte and catholyte tanks 22 and 24 provides primary containment structures for the anolyte and catholyte in the redox flow battery 20 in separate enclosures. FIG. 7 illustrates the anolyte and catholyte tanks 22 and 24 positioned side-by-side (or front-and-back) in the main compartment 62. FIG. 8 shows a bottom view of the anolyte tank 22 and the catholyte tank 24 positioned side-by-side (or front-and-back) in the main compartment 62. In a side-by-side (or front-and-back) configuration, the tanks are aligned along one surface or one wall. In the illustrated embodiment shown in FIGS. 7 and 8, the representative bottoms of the anolyte and catholyte tanks 22 and 24 are generally rectangular.

Referring to FIG. 7, the top portion of the catholyte tank 24 has a shoulder or stepped shelf section 90 located at the front upper corner of the forward positioned tank (which is the catholyte tank 24 in the illustrated embodiment). The stepped shelfs section 90 is located at a height above the bottom of the tank assembly 26 and below the main compartment 62 of the shell 50 height defining a space within the shell 50.

The space in the shell 50 (defined by the stepped shelf section 90) provides access for an electrolyte transfer conduit 92 (see FIG. 3) to provide fluid communication between the anolyte tank 22 and the catholyte tank 24 when the tanks are aligned side-by-side, as described in greater detail below. The space created by the stepped shelf section 90 also provides a location for the pump assembly 120 including anolyte and catholyte pumps 122 and 124 and filters 150 (see FIG. 3), as described in greater detail below. The pump assembly 120 may also include optional unions. However, in accordance with other embodiments of the present disclosure, one or both of the tanks 22 and 24 need not be manufactured to include a stepped shelf section 90 or may include another configuration to optionally accommodate the electrolyte transfer conduit 92 and/or the anolyte and catholyte pumps 122 and 124.

In some embodiments, anolyte tank 22 and/or catholyte tank 24 are constructed from molded or fabricated plastic, fiberglass, or other materials or combinations of materials. In some embodiments, tanks 22 and/or 24 have a rigid or semi-rigid construction. In some embodiments, the material comprising the walls of the tanks 22 and/or 24 are configured to flex outwardly when filled with electrolyte in order to contain the electrolyte therein. As such, the tanks in some embodiments can expand or contract to accommodate the expected range of changes in electrolyte volume or pressure during operation.

In some embodiments, the anolyte tank 22 and/or catholyte tank 24 are constructed such that some portions of the tanks are more rigid to support equipment or other features attached to the tanks, while other portions of the tanks may retain flexibility as described above. In addition, the anolyte tank 22 and/or catholyte tank 24 may be constructed such that some portions of the tanks are thicker for structural support, while other portions of the tanks may be thinner to enable heat transfer, as described in greater detail below.

The catholyte tank 24 is configured to be substantially similar to the anolyte tank 22. In one embodiment of the present disclosure, the catholyte tank 24 has a smaller volume than the anolyte tank 22, as described in greater detail below. An optimized tank size ratio between the anolyte and catholyte tanks 22 and 24 provides a means to maintain maximum energy storage capacity of the RFB module 20 over multiple cycles. The difference in volume between the anolyte and catholyte tanks 22 and 24 can be realized via the tank dimensions, for example, of the anolyte tank 22, or the tanks can have nearly identical footprints (see FIG. 8) but the catholyte tank 24 may include a stepped section 90 (see FIG. 7). In lieu of a stepped section, the smaller tank may include a cavity bottom that is higher than the floor of the tank or a filler material, such as an inert material, that takes up some of the volume of the tank. In other embodiments (not shown), the anolyte tank may have substantially the same volume as the catholyte tank or may have a smaller volume than the catholyte tank.

In some embodiments of the present disclosure, the anolyte tank 22 and the catholyte tank 24 are configured so as to store a combined volume of electrolyte of about 1.0 cubic meters or greater. In one representative embodiment, the total combined volume may be in the range of about 1.0 to about 2.0 cubic meters.

As shown in FIG. 7, the tanks 22 and 24 are sized to fit closely into the shell 50. For example, the length of each tank 22 and 24 is such that they abut against the walls for the main compartment 62 of the shell 50. Therefore, the walls of the main compartment 62 of the shell 50 provide support to the tanks 22 and 24 to prevent deformation of the tanks 22 and 24. In one embodiment, the tanks may be configured to abut one another and provide support to each other along the abutting sides 72 and 74 of the respective tanks 22 and 24 (see FIG. 8). In another embodiment, the main compartment 62 may be configured with a center wall to support the tanks 22 and 24 to prevent deformation of the tanks 22 and 24.

To increase rigidity and strength of the shell 50, and to withstand additional side loading imparted by the electrolyte in the tanks 22 and 24, the walls of the main compartment 62 of the shell 50 can be reinforced. In one embodiment, the shell 50 has a unibody construction. In another embodiment, the shell 50 includes multiple components. The structural support provided by the shell 50 when the tanks 22 and 24 are filled with electrolyte allows for the tanks 22 and 24 to be manufactured similarly to bladders that have minimal inherent self-supporting structure.

To reduce the possibility of an electrolyte leakage from the tanks 22 and 24, the tanks 22 and 24 generally do not have penetrations below the level of the liquid stored in the tanks 22 and 24. In the illustrated embodiment, there is one penetration into each tank 22 and 24 slightly below the liquid level in one of the tanks to accommodate the electrolyte transfer conduit 92 (see FIG. 3). As described in greater detail below, the electrolyte transfer conduit 92 is positioned near the top of each tank 22 and 24 and allows for electrolyte flow between tanks 22 and 24 to rebalance the volume of electrolyte in the tanks 22 and 24.

In the event of a leak of electrolyte in the RFB module 20, the main compartment 62 of the shell 50 is manufactured to provide secondary electrolyte containment. As discussed above, the main compartment 62 of the shell 50 may be manufactured from a suitable material, and all seams are fully welded or sealed to provide secondary leak containment. In the illustrated embodiment, the main compartment 62 of the shell 50 is designed as a tub.

Tank Heat Transfer and Tank Channel System

As the battery system 20 runs, heat may be generated and stored in the electrolyte, and unwanted chemical vapors may build up in the shell 50. Referring to FIGS. 7 and 8, a tank heat transfer system is used for continuous air flow between an outer surface of the tank assembly 26 and an inner surface of the main compartment 62 of the shell 50. In the illustrated embodiment, some of the vertical exterior wall surfaces of the tanks 22 and 24 are designed and configured to enhance heat transfer from the electrolyte to the external environment.

In the illustrated embodiment, exterior surfaces of the tanks 22 and 24 include a plurality of abutments 82 for abutting the inner surface of the main compartment 62 of the shell 50, with airflow channels 84 extending between adjacent abutments 82 for airflow between the abutments 82.

As seen in FIGS. 7 and 8, the airflow channels 84 are elongate channels extending along the exterior surfaces of the tanks 22 and 24 when the tanks are abutted against each other in the shell 50. The airflow channels 84 have inlets and outlets connected to first and second manifolds 86 and 88 to dissipate heat from the system. A fan 32 located in the first manifold 86 directs airflow through duct 34. In the illustrated embodiment, the fan 32 is pulling air through the channels, as indicated by airflow arrows A1. However, the fan 32 may be configured for reverse flow, or the fan 32 may be positioned in the second manifold 88. Although shown in the illustrated embodiment as two manifolds 86 and 88, there may be any number of manifolds in the system to optimize air flow around the tank assembly 26.

In accordance with embodiments of the present disclosure, the channels 84 may be configured like an arch bridge to maximize the strength and heat dissipation effects of the walls of the tanks 22 and 24. As seen in FIG. 7, the abutments 82 of the tanks provide structural support for abutting the tanks 22 and 24 against inner surface of the main compartment 62 of the shell 50. The channels 84 extending between adjacent abutments 82 are designed as arches to optimize the arch action, transferring the forces on the arches to the abutments 82. Such design allows the tank wall strength to contain the volume of electrolyte, while also providing channels 84 for airflow passage along the exterior surfaces of the walls of the tanks 22 and 24.

In the illustrated embodiment, twelve airflow channels 84 are provided in the external vertical wall surfaces of the tank assembly 26. However, the number and sizing of the airflow channels 84 and the abutments 82 may be designed and configured in accordance with system constraints for tank wall strength and desired heat dissipation. For example, systems 20 residing in hotter or cooler climates may need more or less heat dissipation and/or more or less strength.

In accordance with embodiments of the present disclosure, the tanks 22 and 24 may be manufactured with abutments 82 and airflow channels 84 to further optimize the structural and heat transfer properties of the tanks. Referring to FIGS. 9A and 9B, cross-sectional views of tank walls are provided. In FIG. 9A, in accordance with one embodiment of the present disclosure, the walls of the tanks 22 and 24 have a uniform cross-sectional thickness across the abutments 82 and airflow channels 84.

In FIG. 9B, in accordance with another embodiment of the present disclosure, walls of the tanks 22 and 24 have a non-uniform cross-sectional thickness across the abutments 82 and airflow channels 84. In FIG. 9B, the abutments 82 are designed with a thickness T1 to optimize tank strength, while the airflow channels 84 are designed with a variable thickness from T1 to T2 to optimize heat transfer across the tank wall in the airflow channels 84.

In one embodiment of the present disclosure, the tanks 22 and 24 are manufactured from plastics via conventional molding processes, such as blow molding or injection molding, to achieve uniform wall thickness. In another embodiment, the tanks 22 and 24 are manufactured from plastics via other molding processes, such as rotational molding, to achieve non-uniform wall thickness.

In the illustrated embodiment, the tank assembly 26 is designed with channels 84 for heat transfer along at least a portion of the exterior vertical side wall surfaces of the tanks 22 and 24 in contact with the main compartment 62 of the shell 50. Along the interface 28 between the tanks 22 and 24, there are no channels 84. Therefore, the tanks 22 and 24 support each other or rest against a dividing wall along this interface 28. However, in other embodiments, the tanks 22 and 24 may include channels 84 along the interface 28.

Other channels in the tanks 22 and 24 on top, bottom, and upper wall surfaces are configured for manufacturing advantages and for leak containment in the system 20. For example, referring to FIG. 8, top channels 110 carry any electrolyte spills from the electrochemical cell 30 away from the top surfaces of the tanks 22 and 24 to side containment within the main compartment 62 of the shell 50. Likewise, shelf channels 112 on the stepped shelf section 90 of the catholyte tank 24 carry any electrolyte spills from the stepped shelf section 90 to side containment within the main compartment 62 of the shell 50. Referring to FIG. 9, interface channels 114 extending through the interface 28 between the tanks 22 and 24 to the bottom surfaces of the tanks 22 and 24 receive and contain any electrolyte spills making their way to the interface 28.

Electrolyte Circulation System

As described above regarding the general operation of a RFB 20, an electrolyte circulating system 40 is provided for circulating the anolyte and the catholyte from respective tanks 22 and 24 into the electrochemical cell 30 (see FIG. 3).

Figure 10:
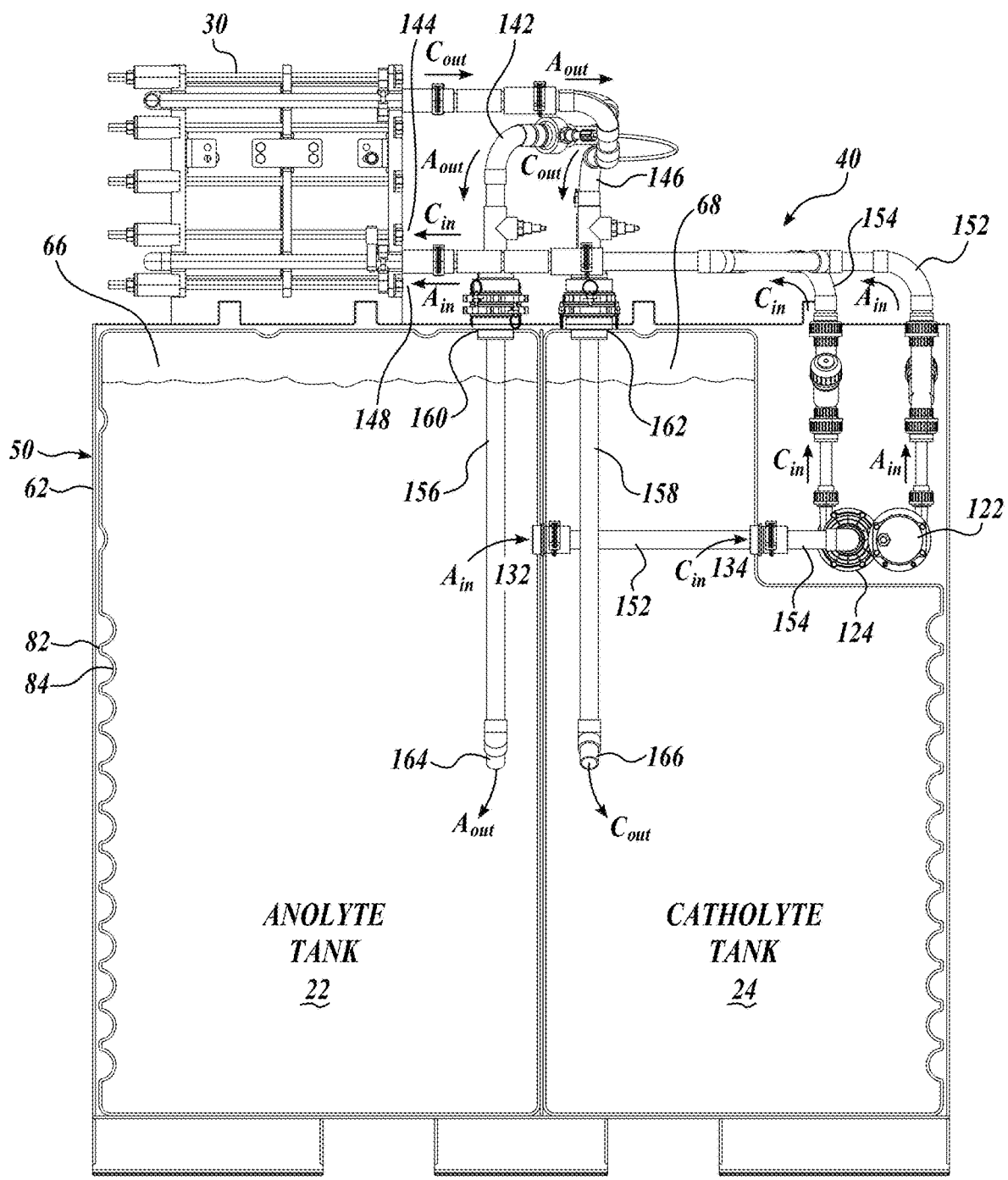
FIG. 10 is a cross-sectional view of major components of the redox flow battery of FIG. 1 showing exemplary electrolyte travel paths.
Figure 11:
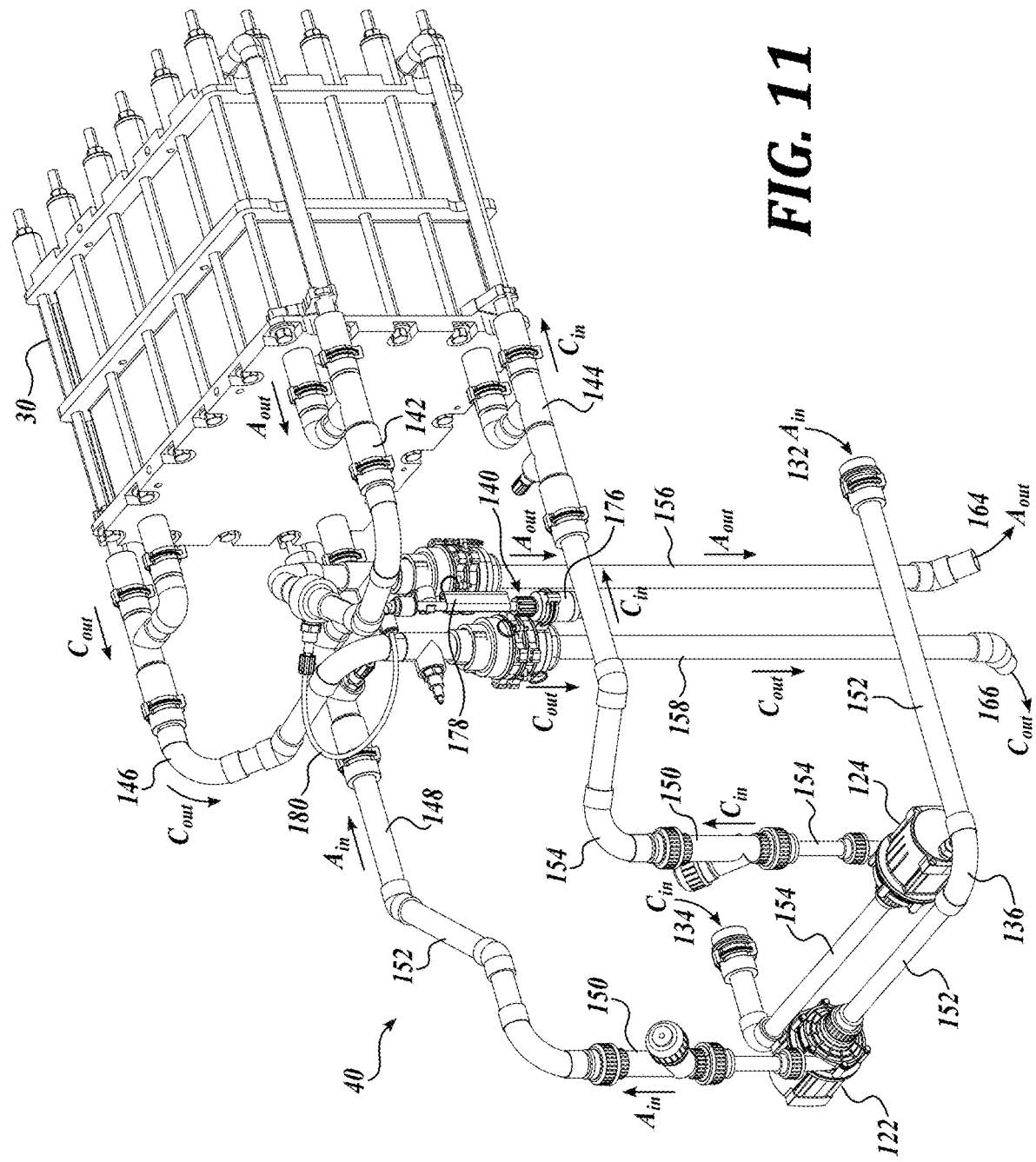
FIG. 11 is an isometric view of a system for circulating electrolyte in the redox flow battery of FIG. 1 showing exemplary electrolyte travel paths.

Referring to FIGS. 10 and 11, the electrolyte circulation system 40 will now be described in greater detail.

Referring to FIGS. 10 and 11, anolyte and catholyte is delivered from the tank ports 132 and 134 of the respective anolyte and catholyte tanks 22 and 24 to the electrochemical cell 30 using pumps 122 and 124. After traveling through cell feed lines 152 and 154 of the electrolyte circulating system 40 to the electrochemical cell 30, anolyte and catholyte is returned via anolyte and catholyte return lines 142 and 146, which discharge to the respective anolyte and catholyte tanks 22 and 24.

Referring to FIGS. 7 and 10 and 11, the electrolyte flow path of the anolyte will be described in greater detail. From the anolyte tank 22, anolyte travels along a horizontal path along the stepped shelf 90 from anolyte tank port 132 through anolyte feed lines 152 to elbow 136 to the anolyte pump 122. From the anolyte pump 122, anolyte is pumped through vertical feed line 152 and filter 150, continuing through anolyte feed lines 152 to the anolyte inlet 148 in the electrochemical cell 30.

Still referring to FIGS. 7 and 10 and 11, the electrolyte flow path of the catholyte will now be described in greater detail. From the catholyte tank 24, catholyte travels along a horizontal path along the stepped shelf 90 from catholyte tank port 134 through catholyte feed lines 154 to elbow 138 to the catholyte pump 124. From the catholyte pump 124, catholyte is pumped through vertical feed line 154 and filter 150, continuing through catholyte feed lines 154 to the catholyte inlet 144 in the electrochemical cell 30.

Seals at the respective tank ports 132 and 134 of the anolyte and catholyte tanks 22 and 24 seal the holes 132 and 134 leading into the tanks 22 and 24 (see FIG. 7).

In the anolyte and catholyte tanks 22 and 24, the return system from the anolyte and catholyte outlets 142 and 146 of the electrochemical cell 30 tank immersed return lines 156 and 158 extending into the tanks 22 and 24. Seals at the respective upper walls of the anolyte and catholyte tanks 22 and 24 seal the holes 160 and 162 leading into the tanks 22 and 24 (see holes 160 and 162 in FIG. 7).

As seen in FIGS. 10 and 11, at the discharge ends 164 and 166 of anolyte and catholyte tank immersed return lines 156 and 158, the exit piping can be configured in at an angle relative to the walls of the tanks 22 and 24 to encourage electrolyte mixing in the tanks 22 and 24.

Because the electrochemical cell 30 is disposed above the tanks 22 and 24, pumping action is required to supply electrolyte to the cell 30. The electrolyte circulating system 40 is designed such that when the pumping action is turned off, most of the electrolyte in the cell 30 will drain back to the respective anolyte and catholyte tanks 22 and 24. Small holes in the immersed return line 156 and 158 (not shown) let gas in to permit the stack and piping to drain.

Pump Assembly Configuration

The pump assembly 120 of the present disclosure provides electrolyte circulation via pumps 122 and 124 between the electrolyte storage tanks 22 and 24 and the electrochemical cell 30 of the redox flow battery 20. Referring to FIG. 3, the pump assembly 20 of the illustrated embodiment is along the stepped shelf 90 on the catholyte tank 24. The main compartment 62 of the shell 50 is configured to fully enclose the anolyte and catholyte tanks 22 and 24 (including the stepped shelf 90), as seen in FIGS. 7 and 10. As will be described in detail below, the pump assembly 120 is designed and configured for rotation above the walls of the main compartment 62 for the pumps 122 and 124 and filters 150 to be accessible for maintenance and replacement.

Figure 12A:
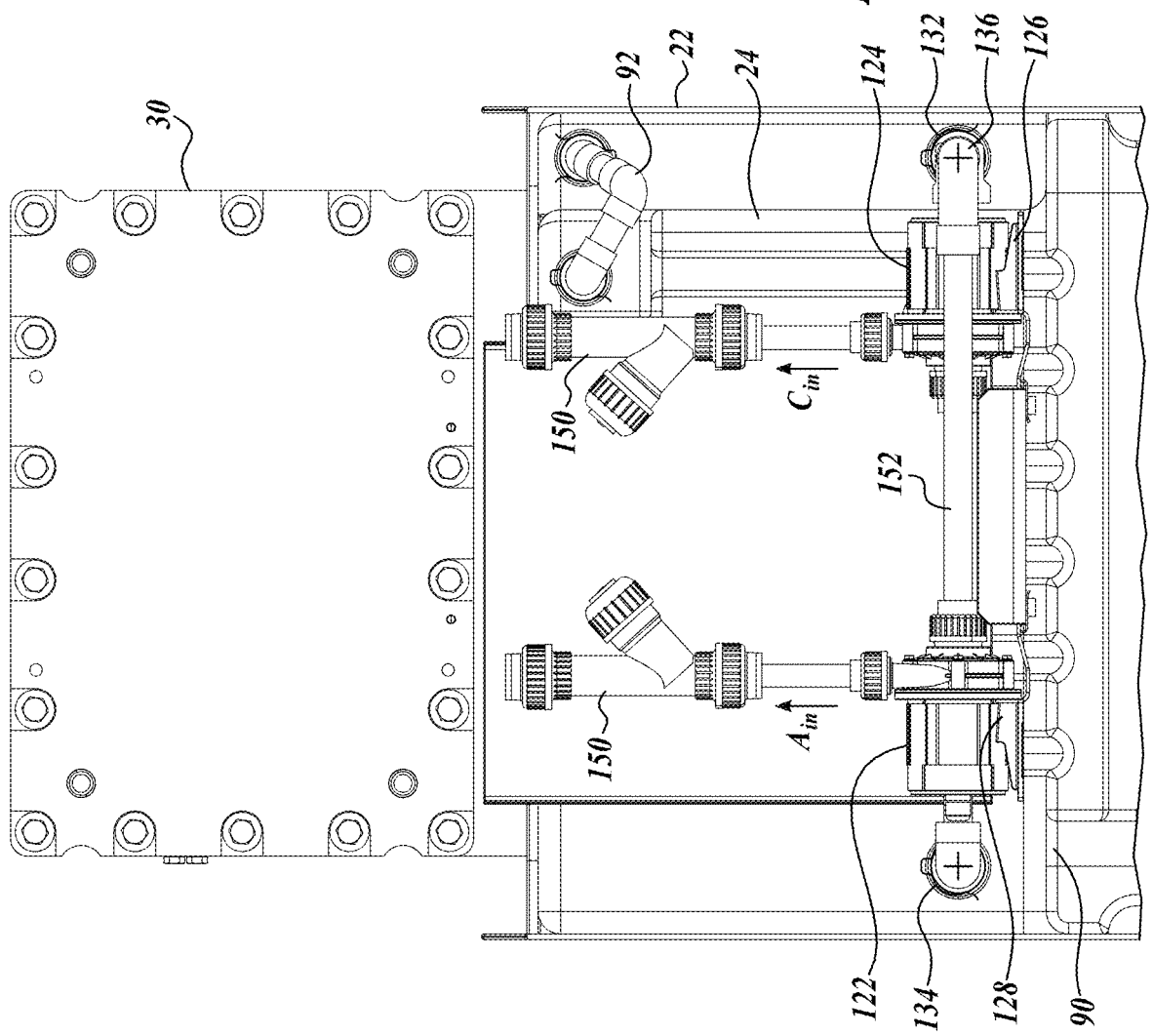
Figure 13A:
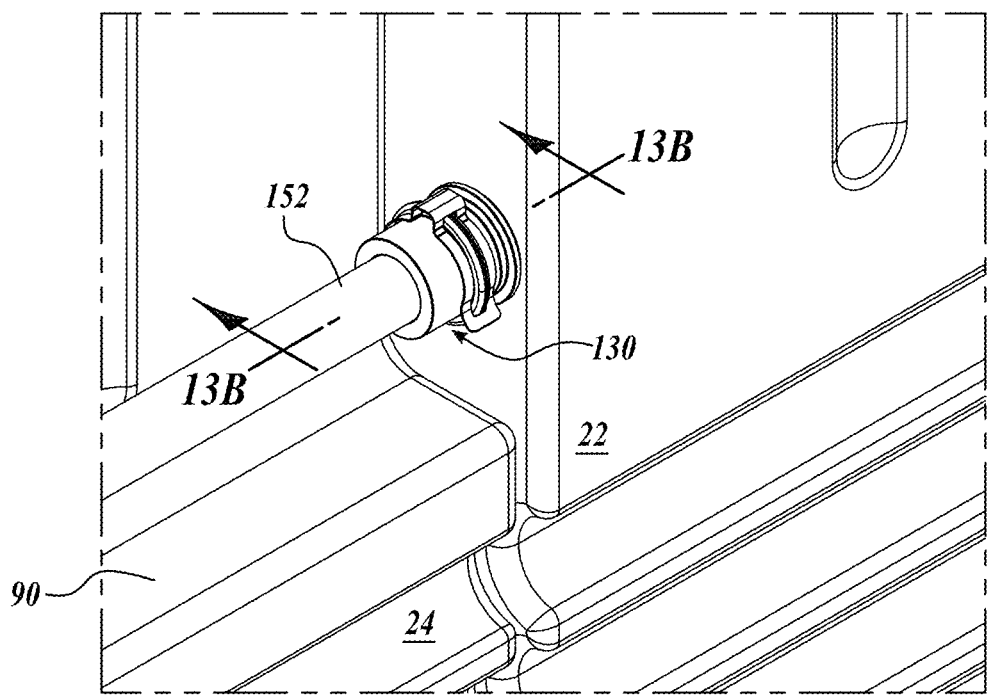
FIGS. 13A-13D are various views of exemplary conduit coupling for the redox flow battery of FIG. 1.
Figure 13B:
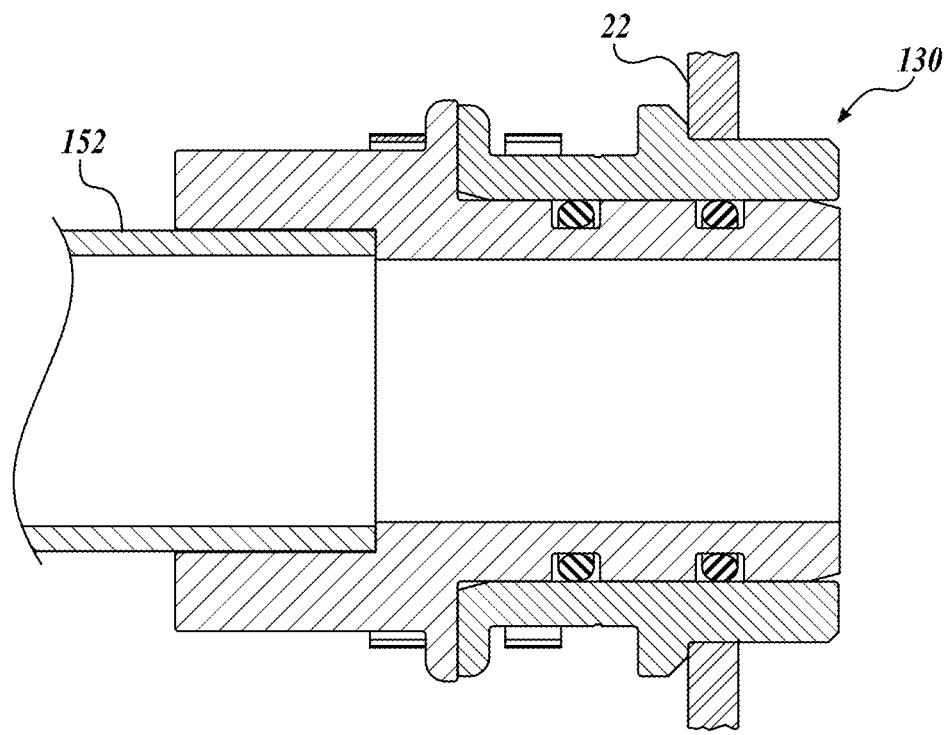
Figure 13C:
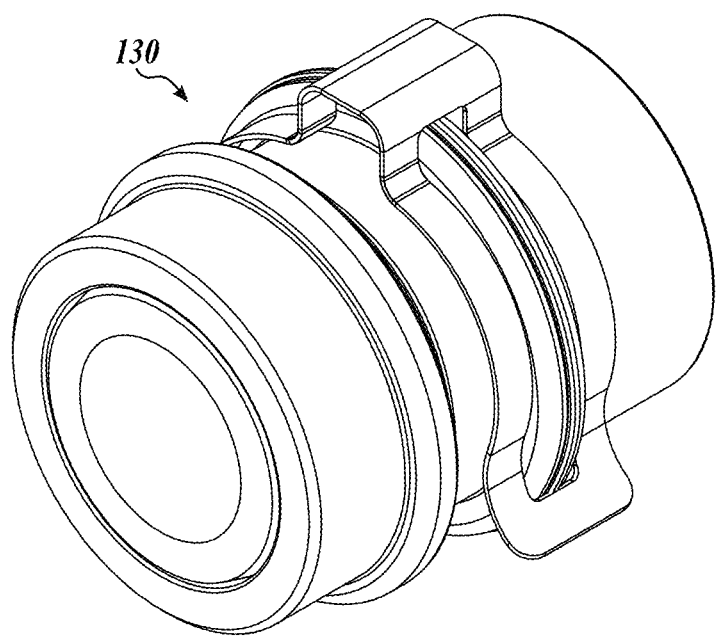
Figure 13D:
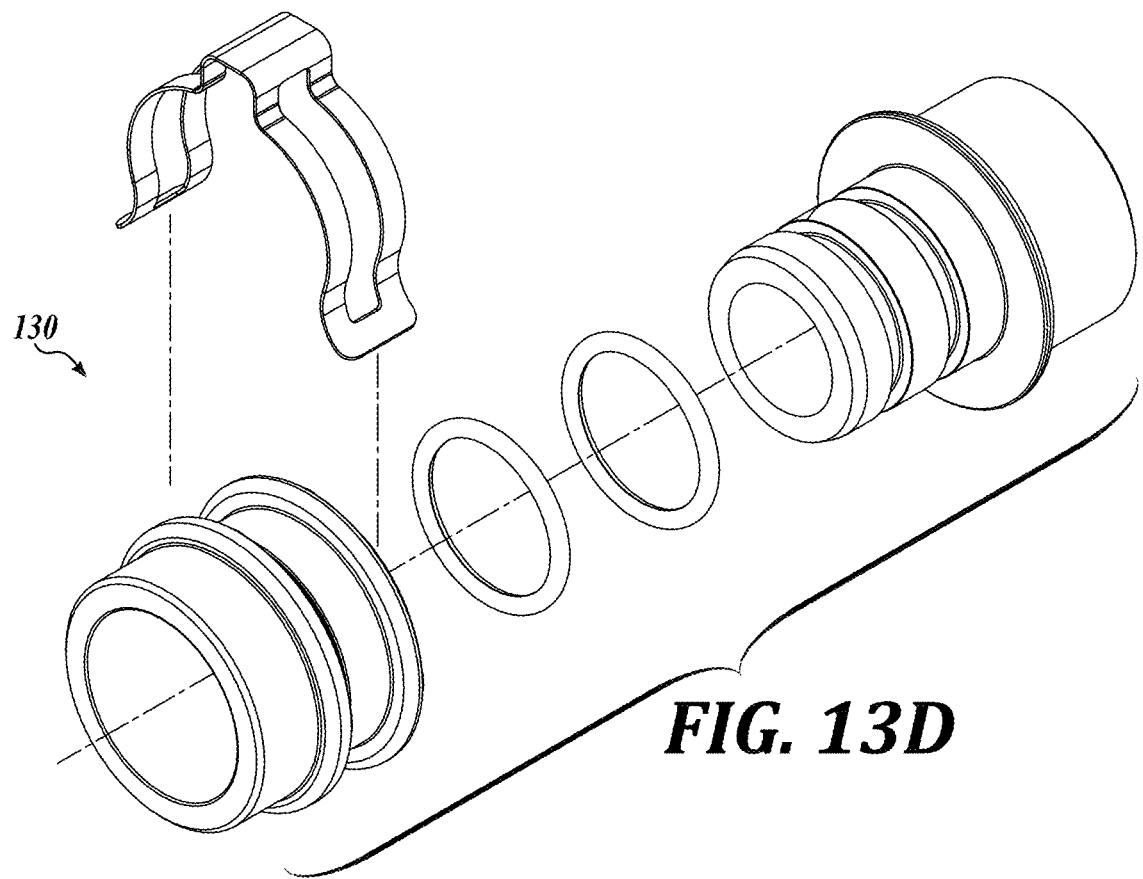

Referring to FIGS. 12A and 12B, the rotational design of the pump assembly 120 will be described in greater detail. Referring to FIG. 12A, the pumps 122 and 124 of the pump assembly 120 nest on the stepped shelf 90 and are supported by pump supports 126 and 128. To rotate the pumps to the configuration shown in FIG. 12B, filters 150 are disconnected from the respective electrolyte feed lines 152 and 154 (see FIGS. 10 and 11) and the pumps 122 and 124 and filters 150 are rotated (see arrow A2) about the pivot axes of the anolyte and catholyte tank ports 132 and 134 to be positioned above the top wall of main compartment 62.

To reengage the system, the pumps 122 and 124 and filters 150 can be rotated back to their original position about the pivot axes of the anolyte and catholyte tank ports 132 and 134 and the filters 150 can be reconnected to the respective electrolyte feed lines 152 and 154 (see FIGS. 10 and 11).

Because the pumps 122 and 124 are positioned on the stepped shelf 90 in a staggered configuration, both pumps can be rotated to their positioning above the top wall of main compartment 62 at the same time.

In accordance with embodiments of the present disclosure, the pump assembly 120 is moveable between a first position in the main compartment 62 of the shell 50 and below the electrolyte liquid height during operation of the pump assembly 120 and a second position above the electrolyte liquid height when the pump assembly 120 is not operating. In the second position, the pump assembly 120 may be above or below the height of the main compartment 62 of the shell 50.

Referring now to FIGS. 13A-13D, coupling interface 130 of the electrolyte feed lines 152 and 154 to the anolyte and catholyte tank ports 132 and 134 allow for rotation. The coupling interface provides double radial o-ring seals that prevent leakage and allow for rotation while maintaining a seal.

Electrolyte Adjustments for Managing Energy Storage Capacity

As described previously, the relationship between electrolyte concentration in the anolyte and catholyte tanks generally remains constant after the initial start-up phase. As the battery cycles, the volume and active materials in the anolyte and catholyte tanks can change as a result of inherent chemical reactions, the nature of the battery cell structure, and other factors. Without electrolyte rebalancing between the anolyte and catholyte tanks, the battery energy capacity degrades over time as the result of limited availability of active material in the anolyte or catholyte tank. Therefore, a system that maintains a specific electrolyte concentration ratio between the anolyte and catholyte tanks and/or maximizes the available active materials for energy storage and dispatch is described herein.

Electrolyte Volume Ratio

In one embodiment of the present disclosure, a method of operating a redox flow battery includes having a uniform or non-uniform predetermined volume ratio, based on maintaining a preferred electrolyte concentration, between the quantity of anolyte and the quantity of catholyte in the system. In the case of non-uniform predetermined volume ratio, the quantity or volume of anolyte may be more or less than the quantity or volume of the catholyte. The predetermined starting volume ratio may be different from or the same as the predetermined volume ratio during operation. Moreover, the predetermined volume ratio during operation may change subject to other conditions in the system.

As non-limiting examples, the tank volume ratio may have an anolyte volume to catholyte volume ratio of about 1:1.05 to about 1:1.50, about 1:1.15 to about 1:1.35, or about 1:1.20 to about 1:1.30. As a non-limiting example, in the illustrated embodiment of FIG. 2, the tank volume ratio between the anolyte tank and the catholyte tank is about 1.25:1.

As other non-limiting examples, the tank volume ratio may have a catholyte volume to anolyte volume ratio of about 1:1.05 to about 1:1.50, about 1:1.15 to about 1:1.35, or about 1:1.20 to about 1:1.30.

A non-uniform tank volume ratio may be achieved by having two different tank designs. For example, see the tank configurations in the illustrated embodiment of FIGS. 7 and 10. As described above, the anolyte and catholyte tanks 22 and 24 have similar footprint dimensions (see FIG. 8), but the catholyte tank 24 includes a stepped shelf section 90 near (see FIG. 7). In other embodiments, the tanks may have different footprint dimensions or different height dimensions. In some embodiments, the volume of electrolyte in the tanks may be different, but the anolyte and catholyte tanks 22 and 24 have substantially the same liquid height level to allow for an overflow conduit 92 to maintain a specified tank volume ratio. In other embodiments, the tanks may be partially filled with non-reacting materials to reduce some of the tank volume, or the tank may have a changeable volume to account for changes in the operation of the system.

As described above, a non-uniform tank volume ratio based on maintaining a preferred electrolyte concentration between the anolyte and catholyte tanks can improve the energy density achieved during operation of the RFB module 20 having a given capacity for holding a certain amount of electrolyte. As a non-limiting example, a tank volume ratio of a preferred, non-uniform, electrolyte concentration, such as about 1.25:1, between the anolyte tank and the catholyte tank in the illustrated embodiment of FIGS. 7 and 10 may achieve and maintain greater energy density for the same total amount of electrolyte as compared to a uniform tank volume ratio between the anolyte and catholyte tanks. Greater energy density is a result of greater availability and utilization of the active species in the electrolyte. In other types of modules, for example, in non-vanadium RFB systems, a preferable tank volume ratio may vary from the preferred range for a VRB system, and for example, may have a greater volume of catholyte compared to anolyte.

Electrolyte Transfer

In accordance with one embodiment of the present disclosure, the RFB 20 has a predetermined volume ratio, based on maintaining a preferred electrolyte concentration, in accordance with the volume ratios of anolyte and catholyte, as described above. Over a period of time of normal operation of the redox flow battery, the volume ratio of the anolyte and the catholyte may become greater than or less than the predetermined volume ratio. For example, in one mode of operation, a VRB system gains catholyte volume and loses anolyte volume over long-term cycling.

Therefore, in accordance with embodiments of the present disclosure, a volume of catholyte from the catholyte storage tank 24 to the anolyte storage tank 22, or a volume of anolyte from the anolyte storage tank 22 to the catholyte storage tank 24, to restore the volume ratio to the predetermined volume ratio. In the exemplary schematic of FIG. 14, excess catholyte generated from the system would flow from the catholyte tank 24 to the anolyte tank 22 to correct the volume imbalance.

Such transfer may be affected by passive electrolyte transfer, active electrolyte transfer, or a combination of passive and active electrolyte transfer, all described in greater detail below.

In one embodiment of the present disclosure, a passive mechanical arrangement allows for the transfer of electrolyte between the anolyte and catholyte tanks. The transfer may be from anolyte tank 22 to catholyte tank 24 or from catholyte tank 24 to anolyte tank 22.

As seen in FIGS. 3, the passive transfer system is a tank electrolyte transfer conduit 92. Referring to the simplified schematic in FIG. 14, the electrolyte transfer conduit 92 is located at an overflow level in either the catholyte or anolyte tank 22 or 24. As discussed above, a stepped shelf section 90 in the catholyte tank 24 allows the electrolyte transfer conduit 92 to nest within the main compartment 62 of the shell and to provide fluid communication between the anolyte tank 22 and the catholyte tank 24 when the tanks are aligned side-by-side.

In this configuration, the flow rate of electrolyte between the tanks 22 and 24 is determined based on the electrolyte level differences in the tanks 22 and 24. As seen in the illustrated embodiment of FIGS. 7, the catholyte tank 24 is sized to have a smaller volume than the anolyte tank 22 by having a stepped shelf portion 90. The electrolyte transfer conduit 92 that extends between conduit connection points 170 and 172 (see also FIG. 15) is located at the overflow level allows for the flow of catholyte from the catholyte tank 24 as the catholyte volume increases into the anolyte tank 22 (or vice versa).

The electrolyte transfer conduit 92 is designed to penetrate each tank 22 and 24 at or slightly below the liquid level to accommodate electrolyte transfer conduit 92. To prevent any leaks that may occur at the joints between the conduit 92 and the tanks 22 and 24, the conduit connection holes 170 and 172 with each tank 22 and 24 may include leak prevention devices, such as unions, axial O-ring fittings, etc.

In embodiments of the present disclosure, the electrolyte transfer conduit 92 in each of the tanks 22 and 24 may be set so as to allow for the transfer of only liquid electrolyte or of both liquid electrolyte and gas (from the headspaces 66 and 68 in the anolyte and catholyte tanks 22 and 24) through the electrolyte transfer conduit 92. If a transfer of gas from the headspaces 66 and 68 in the anolyte and catholyte tanks 22 and 24 is provided, the electrolyte transfer conduit 92 is also a part of the gas management system 94 for the battery, as described in greater detail below.

As can be seen in FIG. 12A, the electrolyte transfer conduit 92 of the illustrated embodiment is configured with a slightly lower elevation change between the connection points to the anolyte and catholyte tanks 22 and 24. The elevation change permits only fluid transfer. In the illustrated embodiment, a separate gas crossover 98 provides for free gas exchange between the anolyte and catholyte headspaces 66 and 68 (see FIGS. 14 and 15).

In one embodiment of the present disclosure, the electrolyte transfer conduit 92 delivers excess catholyte to the anolyte tank 22 during operation to account for the volumetric increase in the catholyte and return the system to a predetermined volume ratio.

In accordance with other embodiments of the present disclosure, the tanks 22 and 24 need not be manufactured to include a stepped shelf section 90 or may include another configuration to accommodate either an electrolyte transfer conduit or another fluid transfer device between tanks 22 and 24. For example, a suitable electrolyte transfer conduit may be located not at an overflow position, but instead below the liquid level in each of the tanks. In such a configuration, the electrolyte transfer conduit would provide continuous electrolyte exchange between the anolyte and catholyte. The rate of exchange may be determined in part by the length and diameter of the transfer conduit.

In addition to, or in lieu of the passive transfer system such as electrolyte transfer conduit 92, the RFB module 20 may include an active transfer system configured for actively transferring electrolyte from one to the other of the anolyte and catholyte tanks. Such active transfer may include pumping or otherwise controlling electrolyte tank-to-tank transfer using a valve system. The active transfer may be automatically controlled based on system conditions or manually controlled by an operator.

If a combination of passive and active electrolyte transfer systems is employed, the active system may use the same or a separate electrolyte transfer conduit as the passive system.

Gas Generation During Operation

Most RFBs have side reactions, such as hydrogen generation. Hydrogen generation increases the average oxidation state of the electrolytes, which can result in a capacity decrease. In addition, hydrogen gas generation in a closed space can create fire and safety concerns. Further, most RFB negative electrolyte solutions include strong reductants that can be oxidized by oxygen in the air. Such oxidation can increase the average oxidation state of the electrolytes, which can result in a capacity decrease.

For chloride-containing redox flow battery systems, a small amount of chlorine gas may be generated, which can also create fire and safety concerns. Chlorine gas is a strong oxidant, and therefore, can be absorbed by the negative electrolyte solutions through surface contact if the chlorine gas is permitted to travel to the headspace 66 of the anolyte tank 22, as discussed below with reference to a gas management system.

Gas Management System

A gas management system 94 can be employed to manage the gasses generated in a redox flow battery 20. Although the gas management system described herein is designed for a vanadium redox flow battery, the same gas management system concepts may be applied to other non-vanadium redox flow batteries.

Figure 14:
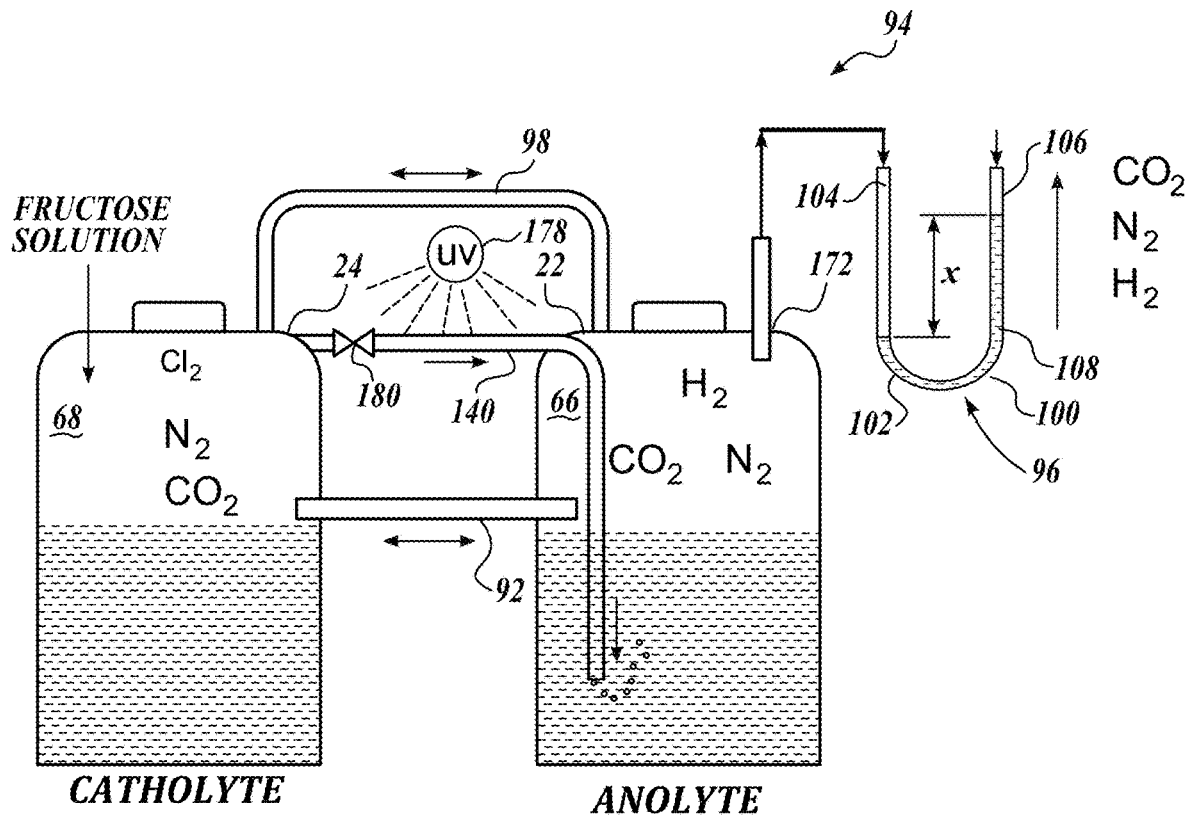
FIG. 14 is a schematic view of a redox flow battery system in accordance with one embodiment of the present disclosure, showing exemplary chemical properties of the system.

With reference to the simplified schematic in FIG. 14, the components of the gas management system 94 will now be described. As discussed above, anolyte and catholyte tanks 22 and 24 are in a substantially sealed system with liquid electrolyte in each tank, and each tank may include a headspace 66 and 68 above the respective anolyte and catholyte. In the illustrated embodiment, the headspaces 66 and 68 above the anolyte and catholyte may have free gas exchange with the respective anolyte and catholyte via gas exchange conduit 98 (see also FIG. 15).

In the illustrated embodiment, the gas management system 94 includes the gas headspaces 66 and 68, a gas transfer device 98 between the anolyte and catholyte tanks 22 and 24 one or more other gas transfer devices 140, and a gas pressure management system 96 (shown as U-tube 100, to be described in greater detail below).

During operation, anolyte and catholyte tanks 22 and 24 are filled with electrolyte up to a fill line allowing for a headspace 66 and 68 in each tank 22 and 24 (see FIG. 11A), and then sealed. The RFB system 20 is started in operation and the gas compositions of the headspaces start to change as oxidation starts to occur and hydrogen starts to be generated. In one mode of operation, air is present in the respective headspaces of the anolyte and catholyte headspaces during electrolyte filling or other maintenance operations when the tanks are sealed. In another embodiment, the headspaces are purged with nitrogen or another inert gas as part of the sealing process.

As discussed above, the tank system may include a tank electrolyte transfer conduit 92 located at or below an overflow level in either the anolyte or catholyte tank 22 or 24. In some embodiments, the electrolyte transfer conduit 92 may allow for the transfer of liquid electrolyte and gas exchange from the headspaces in the anolyte and catholyte tanks 22 and 24.

In other embodiments, the gas transfer device 98 may be an independent gas transfer device different from the electrolyte transfer conduit 92. For example, the gas transfer device may be a conduit designed for gas exchange between the anolyte and catholyte headspaces 66 and 68, but not for liquid electrolyte transfer.

The gas transfer system 94 provides a means to equalize the pressure between the anolyte and catholyte tanks, control the flow and exit location of gasses vented by the gas management system, and allows for diffusion of gas between the anolyte and catholyte tanks.

In one embodiment of the present disclosure, for example, a VRB, chlorine gas generated in the catholyte tank 24 by the following equation diffuses through the gas transfer device 98 and moves to the headspace in the anolyte tank 22.

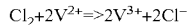

$$Cl_2 + 2V^{2+} => 2V^{3+} + 2Cl^-$$

When in the anolyte headspace over the anolyte surface, the chlorine gas is absorbed by the anolyte as it is reduced to $Cl^-$. The chlorine gas reduces quickly in the anolyte tank, before it has a chance to vent from the gas management system 94 through the gas pressure management system 96, described below.

Figure 15:
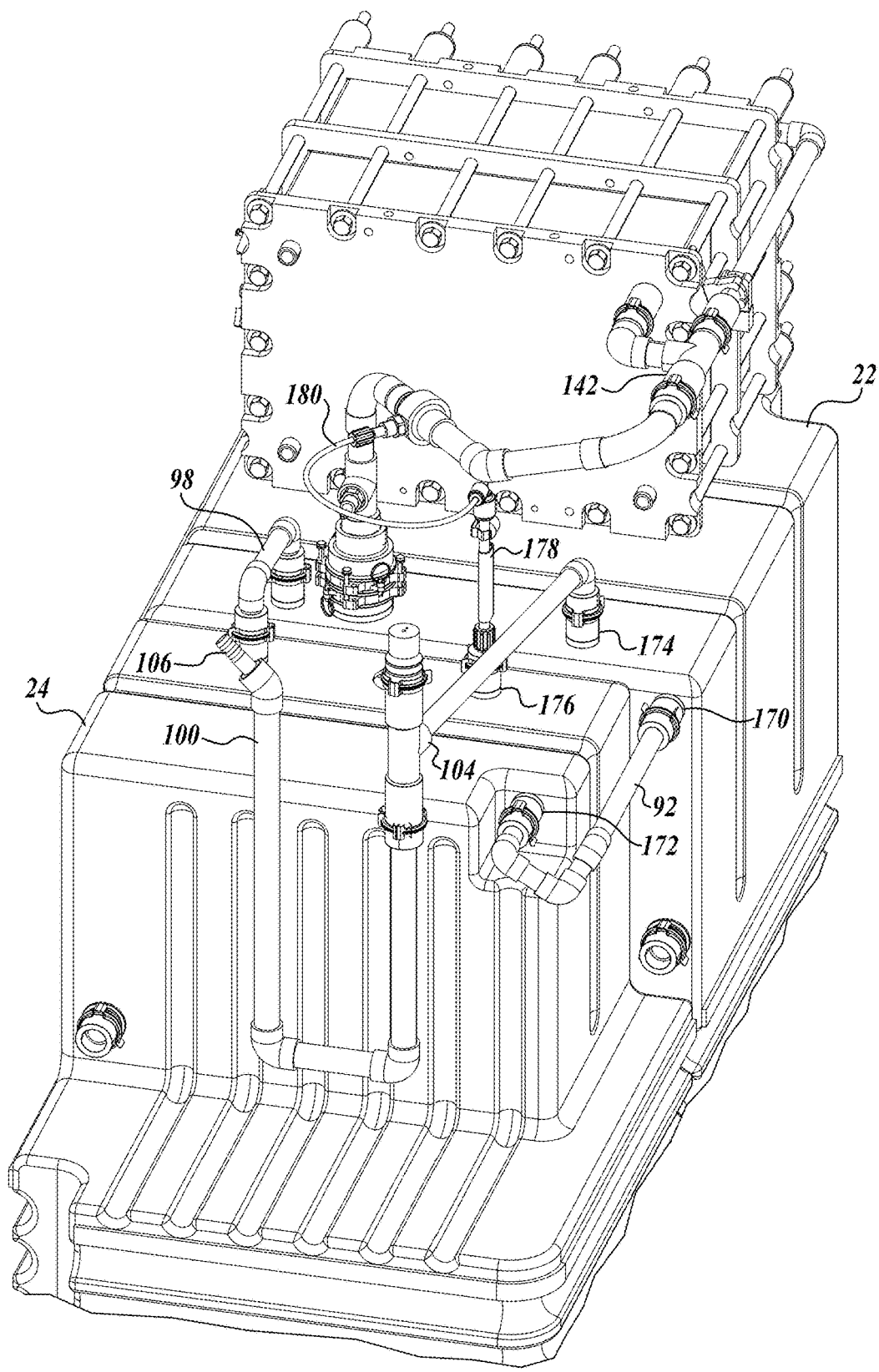
FIG. 15 is an isometric view of a system for gas management in the redox flow battery of FIG. 1 showing exemplary gas management components.

As seen in FIGS. 7, 11, and 15 in the illustrated embodiment, a gas transfer system 140 between the catholyte and anolyte headspaces will be described. The gas from the catholyte headspace 68 is vented through hole 176 (see FIG. 7) to a venturi 180 that creates a vacuum and draws gas from the catholyte headspace 68 into the anolyte return line 142 from the electrochemical cell 30. By combining into the return line 142, the treated gas from the catholyte headspace 68 makes its way into the anolyte tank 22 at or below the liquid level of the anolyte.

On its path from the catholyte headspace 68 to the anolyte return line 142, the gas passes through a UV treatment zone 178 to be pre-treated with UV light. Such UV light treatment is a catalyst which causes the chlorine and hydrogen gases to form hydrogen chloride vapor. Such HCl vapor is more readily absorbed by the anolyte, reducing the risk of chlorine gas accumulation in the gas crossover lines or chlorine gas leaks.

The formation of HCl from $Cl_2$ and $H_2$ is an exothermic reaction, which produces heat. If the chlorine levels venting from the catholyte headspace 68 to the gas transfer system 140 and the UV treatment zone 178 are high, significant heat will be produced by the exothermic reaction. Therefore, an optional heat sensor (not shown) in or near the gas transfer system 140 can be an indicator of abnormal chlorine levels in the system, which can provide information to the control to adjust the system parameters, for example, to stop charging or to discharge energy from the system.

Gas Pressure Control

In addition to one or more gas transfer devices, the gas management system 94 may also include one or more gas pressure management systems 96 to maintain a barrier between ambient air and the gas management system 94, control gas pressure in the headspaces 66 and 68 of the gas management system 94, and allow any necessary bi-directional pressure equalization between ambient air and the gas management system 94.

In that regard, the gas pressure management device 96 may allow for the release of excess hydrogen gas generated by the anolyte in the anolyte tank 22. The gas pressure management device 96 may also release carbon dioxide and nitrogen, and any other gases that may build up in the gas management system 94. However, as discussed above, any chlorine gas generated by a system (such as a vanadium redox flow battery containing chloride) tends to be absorbed by the anolyte if the chlorine gas is allowed to migrate from the headspace 68 in the catholyte tank 24 to the headspace 66 in the anolyte tank 22 through gas transfer device 92.

Referring to FIG. 15, in accordance with one embodiment of the present disclosure, the gas pressure control device is a U-shaped tube (U-tube) 100 in fluid communication with the headspace 66 of the anolyte tank 22 (see anolyte vent hole 174 to U-tube in FIG. 8). Although shown in fluid communication with the headspace 66 of the anolyte tank 22, the U-tube 100 could also be suitable configured to be in fluid communication with the headspace 68 of the catholyte tank 24.

As illustrated in FIG. 8, a hole 174 provides an access position for the U-tube 100 to the head space 68 in the anolyte tank 22. However, other suitable connector points are within the scope of the present disclosure. In the illustrated embodiment, the U-tube 100 is positioned to reside in the space created by the stepped shelf 90 on the catholyte tank 24.

In the illustrated embodiment of FIG. 15, the U-tube 100 has a U-shaped body 102 and a first end 104 in fluid communication with the headspace 66 of the gas management system 94 and a second open end 106 in fluid communication with an external atmosphere. The body 102 contains an amount of liquid 108 (see FIG. 14) that remains in the plumbing trap created by the U-shaped body 102 between the first and second ends 104 and 106.

In the illustrated embodiment, the U-tube body 102 is a conduit which may have a constant cross-sectional area along the length of the U-tube from the first end 104 to the second end 106. In another embodiment, the U-tube body 102 may have a different cross-sectional area at the first end, as compared to the second end.

The U-tube body may be designed to include baffles or enlarged sections to prevent the loss of liquid as a result of bubbling or a sudden discharge of gas.

As non-limiting examples, the U-tube may be filled with a liquid selected from the group consisting of water, an alkaline aqueous solution, propylene glycol, ethylene glycol, an aqueous solution of inorganic compound, an aqueous solution of organic compound, a water insoluble organic liquid, and combinations thereof, through which certain gases in the headspaces of the RFB will diffuse. A suitable liquid may be selected depending on the system, operating pressures, and types of gasses being emitted from the gas management system 94. Other suitable liquids may be selected to provide certain operating characteristics, for example, a desired temperature range or an ability to scrub or eliminate undesired vent gases (such as chlorine) from atmospheric discharge. In some non-limiting examples, the U-tube 100 may include a combination of liquids, for example, an alkaline solution with an oil layer on top.

The U-tube 100 may also be filled with a buffer solution for absorbing acidic or acid-forming gases, such as HCl and chlorine gas. The buffer solution can include a pH indicator to show it has become acidified and needs to be changed.

The U-tube 100 of the present disclosure allows for bi-directional gas exchange between the gas management system and the atmosphere. In the illustrated embodiment, the U-tube 100 is in fluid communication with the anolyte headspace 66 in the anolyte tank 22 and the atmosphere. In one non-limiting example, the U-tube 100 may include, for example, 10 inches of water. In this example, when the pressure inside the anolyte headspace exceeds 10 inches of water, gases such as hydrogen may start to bubble out of the tube into the atmosphere.

The U-tubs 100 may be configured to allow entry of an external gas into the gas management system when an exterior battery pressure exceeds an interior battery pressure, for example, greater than or equal to 15 inches water. In the same example, the U-tube will prevent the entry of an external gas into the anolyte storage tank when the exterior battery pressure exceeds the interior battery pressure by less than 15 inches water. In addition, the tank head space may have some flexibility to allow for expansion.

In one embodiment, the U-tube 100 may have a uniform cross-section at the first and second ends. In another embodiment, a U-tube 200 may have a different cross-sectional area at the first end, as compared to the second end. The effect of a change in cross-sectional area is that the pressure set points for gas entering and leaving the gas management system may be different. For example, the first and second end cross-sectional areas may be sized so that the pressure requirement for gas exiting the gas management system is 15 inches of water, but the pressure requirement for gas entering the gas management system from the atmosphere is only 6 inches of water. In one embodiment of the present disclosure, the interior battery pressure in the anolyte headspace is between −10 kPa and 10 kPa, −5 kPa to +5 kPa, and −3 kPa to +3 kPa.

In accordance with other embodiments of the present disclosure, the gas pressure management device may include more than one U-tube device, one or more pressure regulating valves, one or more check vales, or a combination of these or other pressure management devices.

As discussed above, hydrogen generation can be a concern in RFBs. In that regard, hydrogen in combination with other gases may reach a flammability limit and pose a risk of ignition. The closed gas management system mitigates this risk by keeping constituent gases in tank head spaces below flammability limits.

Open-Circuit Voltage Cell

Referring to FIG. 6, an open-circuit voltage (OCV) cell 116 can be used to measure the state of charge (SOC) of the redox flow battery 20. In a redox flow battery, it is also generally desirable for the state of charge (SOC) of the anolyte and the catholyte to be matching or close to matching. Matching SOC between the anolyte and catholyte can help mitigate unwanted side reactions in the system (which may generate unwanted hydrogen if the anolyte SOC is too high or unwanted chlorine if the catholyte SOC is too high, if chloride species containing electrolytes are used in the battery). When the SOC values of the anolyte and catholyte are known, the system can be adjusted to return to the target values or target value ranges.

For "matching", the acceptability of the difference between the SOC values of the anolyte and the catholyte depends on the battery system. In one embodiment of the present disclosure, the difference between the SOC values of the anolyte and the catholyte is less than 20%. In one embodiment of the present disclosure, the difference between the SOC values of the anolyte and the catholyte is less than 10%. In another embodiment of the present disclosure, the difference between the SOC values of the anolyte and the catholyte is less than 5%. In another embodiment of the present disclosure, the different between the SOC values of the anolyte and the catholyte is reduced to mitigate side reactions to an acceptable level.

The SOC values of the anolyte and the catholyte can change over time with multiple cycles, often becoming unbalanced or unmatched over time. During operation, real-time monitoring of the status of the electrolytes in a RFB provides information on the operation of the RFB. Real-time monitoring of SOC is typically achieved by measuring the OCV of the positive and negative electrodes using a single-cell type OCV measurement device (see FIG. 6). (Other ways of determining SOC besides OCV are also within the scope of the present disclosure, such as recording and analyzing the amount of energy entering and leaving the battery over a given time period, which may be referred to as coulomb counting.)

Battery Energy Density

Evolving demands and applications for large-scale energy storage systems drive the requirement for energy dense packaging that provides site flexibility and ease of installation. Many RFB systems have relatively low system level energy density, due in part to the combination of their methods of system packaging, for example the use of traditional external tanks, or multiple containers that house the tanks separately from the balance of plant (BOP). Other limitations of traditional system energy density may be due to the inherent chemistry of the electrolyte, limited space availability for subsystems that manage shunt current losses, gasses, electrolyte utilization, or a combination of factors.

In accordance with aspects of the present disclosure, the tanks, the container, and the remaining balance of plant system, such as those described above, can be configured as a self-contained, substantially closed VRB unit that provides maximum energy storage capacity per unit size of the container, while maintaining safe and reliable operating criteria. As such, RFB module 20 shown in FIGS. 1 and 2 constructed in accordance with embodiments of the present disclosure can be configured to have an energy density of 20 watt hours per liter of electrolyte (Wh/L) or greater for an RFB battery that has an energy capacity of at least 2 KW-hours.

The RFB module 20 in embodiments of the present disclosure also may be designed to operate continuously while maintaining designed energy density for a minimum of 50 or a minimum of 100 continuous full charge/discharge cycles or the equivalent operating hours without interruption by service or user input.

General Arrangement

As discussed above the RFB module 20 described herein, as can be seen in FIGS. 1 and 2, is designed to be contained in a shell 50 having specific dimensions. having dimensions designed to fit between a standard commercial single doorway (32"×80"). Space usage for the various components in the system can be optimized to maximize the amount of electrolyte that can be filled into the shell 50. As will be described in more detail below, configuration of the battery, battery sub-systems, or components themselves as well as the synergistic combinations of these elements allow the RFB 20 to achieve the specified energy density, both initially and continuously over a period of time.

Referring to FIGS. 1 and 2, a forklift interface 38 can be provided on the bottom of in the shell 50 for ease of shipping. The forklift interface 38 can be designed to be able to be picked up and maneuvered by a standard capacity pallet jack from the front side of the battery 20. The shell 50 can be designed to fit between a standard commercial single doorway (32"×80").

Operational Features

In addition to space utilization features, one or more operational passive or active management features can be employed to improve the operational efficiency of the RFB module and to also extend the continuous operational period of the RFB module without shutdown.

As noted above, in addition to maximizing the amount of electrolyte contained in the system to maximize energy density, the RFB system is also designed to maintain such energy density over a certain number of cycles, for example, 100 full charge/discharge cycles. To help maintain system capacity, one or more adjustments can be made to the electrolyte during operation of the battery. For example, as the anolyte and catholyte volumes deviate from a predetermined volume, the system can be designed for a constant or periodic transfer of electrolyte from the catholyte to the anolyte (or anolyte to catholyte) to maintain predetermined tank electrolyte volumes, whether by active or passive electrolyte transfer methods. Moreover, individual batteries can automatically be periodically adjusted to conform to a selected OCV value in a string to improve long-term performance.

In addition, an optional gas management system can be employed to remove or minimize reactions that decrease performance over time and mitigate the effects of evolved gases from the electrolyte. Such gases, if left unchecked, could be harmful to the system, create a safety hazard, or require environmental emissions monitoring, particularly chlorine and excess hydrogen gas that may be generated in a RFB.

Electrolyte Composition

In addition to space management for maximizing the amount of electrolyte contained in the system to maximize energy density, the electrolyte itself may be formulated to enhance the energy storage capacity of the RFB. In accordance with embodiments of the present disclosure, in a vanadium redox flow battery, vanadium concentration is selected from the group consisting of higher than 1.5M, higher than 1.8M, and higher than 2.0M.

While illustrative embodiments have been illustrated and described, it will be appreciated that various changes can be made therein without departing from the spirit and scope of the present disclosure.

The embodiments of the present disclosure in which an exclusive property or privilege is claimed are defined as follows:

1. A redox flow battery (RFB), comprising:
a shell having a shell height;
an electrolyte storage tank assembly disposed in the shell, wherein at least a portion of the electrolyte storage tank assembly is supported by the shell, the electrolyte storage tank assembly having an electrolyte liquid height, wherein the electrolyte liquid height is at or below the shell height;
an electrochemical cell; and
an electrolyte circulation system configured for fluid communication between the electrolyte storage tank assembly and the electrochemical cell, wherein the electrolyte circulation system includes a pump assembly, wherein the pump assembly is moveable along the shell height between a first position, where the pump assembly is positioned below the electrolyte liquid height, and a second position, where the pump assembly is positioned above the electrolyte liquid height, wherein the pump assembly is positioned at the first position during operation of the pump assembly and at the second position when the pump assembly is not operating.

2. The redox flow battery (RFB) of claim 1, wherein the electrolyte storage tank assembly includes a stepped shelf located at a height above the bottom of the electrolyte storage tank assembly and below the shell height defining a space within the shell.

3. The redox flow battery (RFB) of claim 2, wherein the pump assembly is located in the space within the shell.

4. The redox flow battery (RFB) of claim 1, wherein the electrolyte circulation system includes a feed line and a port, and wherein the pump assembly is coupled to the feed line and the port of the electrolyte circulation system when the pump assembly is in the first position.

5. The redox flow battery (RFB) of claim 4, wherein the pump assembly is uncoupled from the feed line and remains coupled to the port when the pump assembly in the second position.

6. The redox flow battery (RFB) of claim 5, wherein the pump assembly is rotatable between the first position and the second position while coupled to the port of the electrolyte circulation system.

7. The redox flow battery (RFB) of claim 1, wherein the pump assembly includes a filter and/or a union.

8. The redox flow battery (RFB) of claim 1, wherein the redox flow battery is a vanadium redox flow battery.

9. The redox flow battery (RFB) of claim 1, wherein the electrolyte storage tank assembly includes a catholyte tank and an anolyte tank.

10. The redox flow battery (RFB) of claim 9, wherein the catholyte tank and the anolyte tank are in a side-by-side configuration in the shell.

11. The redox flow battery (RFB) of claim 9, wherein each of the catholyte tank and the anolyte tank define a portion of the tank heat transfer system between an outer surface of each tank and an inner surface of the shell.

12. The redox flow battery (RFB) of claim 9, wherein the anolyte tank has a volume and wherein the catholyte tank has a volume, the ratio of the volume of the anolyte tank to the volume of the catholyte tank being in the range of 1.05:1 to about 1.5:1.13.

13. The redox flow battery (RFB) of claim 9, wherein the catholyte tank and the anolyte tank have substantially the same footprint in contact with a bottom surface of the shell.

14. The redox flow battery (RFB) of claim 9, wherein the catholyte tank and the anolyte tank have substantially the same liquid level.

15. The redox flow battery (RFB) of claim 9, wherein the catholyte tank includes a stepped shelf to reduce the volume of the catholyte tank compared to the anolyte tank.

16. The redox flow battery (RFB) of claim 9, wherein the pump assembly includes catholyte and anolyte pumps.

17. The redox flow battery (RFB) of claim 9, wherein the pump assembly includes catholyte and anolyte filters.

18. The redox flow battery (RFB) of claim 9, wherein the pump assembly in a second position is above the electrolyte liquid height when the pump assembly is not operating.

19. The redox flow battery (RFB) of claim 1, wherein the electrolyte storage tank assembly is made from plastic, and the shell is made from metal.

20. The redox flow battery (RFB) of claim 9, wherein a dividing wall is disposed between adjacent catholyte and anolyte tanks.

21. The redox flow battery (RFB) of claim 1, wherein the electrolyte storage tank assembly includes an anolyte storage tank configured for containing a quantity of an anolyte and an anolyte headspace, and a catholyte storage tank configured for containing a quantity of a catholyte and a catholyte headspace, and further comprising a gas management system including a first gas exchange device having a first end in fluid communication with the catholyte headspace and a second end in fluid communication with anolyte in the anolyte storage tank.

22. The redox flow battery (RFB) of claim 21, wherein the first gas exchange device includes a gas treatment zone for treating evolving gas that is evolving from the catholyte.

23. The redox flow battery (RFB) of claim 21, wherein the evolving gas includes oxygen, carbon dioxide, hydrogen, and chlorine, and any combination thereof.

24. The redox flow battery (RFB) of claim 22, wherein the gas treatment zone includes UV treatment.

25. The redox flow battery (RFB) of claim 24, wherein the UV treatment promotes the recombination of hydrogen and chlorine gas into hydrogen chloride.

26. The redox flow battery (RFB) of claim 21, wherein the first gas exchange device includes a vacuum to draw gas from the catholyte headspace.

27. The redox flow battery (RFB) of claim 21, wherein the first end of the first gas exchange device includes a venturi.

28. The redox flow battery (RFB) of claim 21, wherein the second end of the first gas exchange device is at or below the liquid level in the anolyte.

29. The redox flow battery (RFB) of claim 21, wherein the gas management system further includes a second gas exchange device for gas exchange between the catholyte headspace and the anolyte headspace.

30. The redox flow battery (RFB) of claim 22, wherein the gas treatment zone includes a heat sensor.

31. The redox flow battery (RFB) of claim 21, wherein the gas management system further includes a third gas exchange device configured to contain or release an evolving gas from either or both of the anolyte and catholyte storage tanks to an exterior battery environment when an interior battery pressure exceeds an exterior battery pressure by a predetermined amount.

32. The redox flow battery (RFB) of claim 31, wherein the third gas exchange device comprises an arrangement of one or more of a liquid-filled U-shaped tube, a pressure-regulated valve, a pressure relief valve, or a check valve.

33. A redox flow battery (RFB), comprising:
a shell having a shell height;
an electrolyte storage tank assembly disposed in the shell, wherein at least a portion of the electrolyte storage tank assembly is supported by the shell, wherein the electrolyte storage tank assembly is configured to store an electrolyte liquid such that the electrolyte liquid has an electrolyte liquid height that is at or below the shell height when stored within the electrolyte storage tank assembly, and wherein the electrolyte storage tank assembly includes a stepped shelf located at a height above the bottom of the electrolyte storage tank assembly and below the shell height;
an electrochemical cell; and
an electrolyte circulation system configured for fluid communication between the electrolyte storage tank assembly and the electrochemical cell, wherein the electrolyte circulation system includes a pump assembly, wherein the pump assembly is moveable between a first position, where the pump assembly is coupled to stepped shelf, and a second position, where the pump assembly is spaced apart from the stepped shelf.

34. A redox flow battery (RFB), comprising:
a shell having a first end, a second end, and a shell height extending between the first and second ends;
an electrolyte storage tank assembly disposed in the shell, wherein at least a portion of the electrolyte storage tank assembly is supported by the shell, wherein the electrolyte storage tank assembly is configured to store an electrolyte liquid such that the electrolyte liquid has an electrolyte liquid height that is at or below the shell height;
an electrochemical cell; and
an electrolyte circulation system configured for fluid communication between the electrolyte storage tank assembly and the electrochemical cell, wherein the electrolyte circulation system includes a pump assembly, wherein the pump assembly is moveable within the shell between a first position and a second position such that the pump assembly is positioned closer to the first end of the shell when the pump assembly is in the first position than when the pump assembly is in the second position, and wherein the pump assembly is positioned in the first position when the pump assembly is in operation.

* * * * *

UNITED STATES PATENT AND TRADEMARK OFFICE
CERTIFICATE OF CORRECTION

PATENT NO. : 12,283,726 B2
APPLICATION NO. : 17/592382
DATED : April 22, 2025
INVENTOR(S) : Winter et al.

Page 1 of 1

It is certified that error appears in the above-identified patent and that said Letters Patent is hereby corrected as shown below:

In the Claims

- In Claim 33, Column 26, Lines 19-20, insert -- the -- between "coupled to" and "stepped shelf".

Signed and Sealed this
Sixteenth Day of September, 2025

Coke Morgan Stewart
*Acting Director of the United States Patent and Trademark Office*